United States Patent
Covington et al.

(10) Patent No.: US 6,536,197 B1
(45) Date of Patent: Mar. 25, 2003

(54) MOBILE COTTON HARVESTER WITH COTTON MODULE BUILDING CAPABILITY

(75) Inventors: Michael J. Covington, Bettendorf, IA (US); Jesse H. Orsborn, Port Byron, IL (US); Dwight D. Lemke, Geneseo, IL (US); Steven E. Gaedy, Bettendorf, IA (US); Jeffrey D. Maske, Geneseo, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/989,260

(22) Filed: Nov. 20, 2001

(51) Int. Cl.⁷ ............................................... A01D 46/08
(52) U.S. Cl. .................... 56/28; 56/16.4 R; 100/178
(58) Field of Search ........................ 56/16.4 R, 16.4 A, 56/16.6, 28, 341, 432; 100/7, 83, 177, 178, 151, 152, 210, 226

(56) References Cited

U.S. PATENT DOCUMENTS

| | | | |
|---|---|---|---|
| 2,669,368 A | 2/1954 | Kammueller et al. | 214/522 |
| 3,412,532 A | 11/1968 | Nickla | 56/12 |
| 3,422,751 A | 1/1969 | Hubbard | 100/233 |
| 3,511,399 A | 5/1970 | Sammarco | 214/520 |
| 3,556,327 A | 1/1971 | Garrison | 214/522 |
| 3,691,741 A | 9/1972 | White et al. | 56/344 |
| 3,703,966 A | 11/1972 | Jones et al. | 214/9 |
| 3,733,798 A | 5/1973 | Garrison | 56/350 |
| 3,744,228 A | 7/1973 | Lundahl | 56/344 |
| 3,749,003 A | 7/1973 | Wilkes et al. | 100/35 |
| 3,763,636 A | 10/1973 | Bliss | 56/16.4 |
| 3,779,158 A | 12/1973 | Adee et al. | 100/250 |
| 3,809,269 A | 5/1974 | Lundahl | 214/519 |
| 3,813,861 A | 6/1974 | Wood | 56/344 |
| 3,826,070 A | 7/1974 | Wood | 56/344 |
| 3,827,353 A | 8/1974 | Isberg | 100/232 |
| 3,828,535 A | 8/1974 | Lundahl | 56/344 |
| 3,828,956 A | 8/1974 | Dubo | 214/510 |
| 3,837,506 A | 9/1974 | Dreier | 214/9 |
| 3,840,134 A | 10/1974 | Luscombe | 214/518 |
| 3,842,730 A | 10/1974 | White et al. | 100/245 |
| 3,842,732 A | 10/1974 | Anderson | 100/270 |
| 3,847,072 A | 11/1974 | Garrison | 100/35 |
| 3,875,730 A | 4/1975 | Wood | 56/344 |
| 3,879,049 A | 4/1975 | Husky | 280/19 |
| 3,886,719 A | 6/1975 | Garrison et al. | 56/344 |

(List continued on next page.)

FOREIGN PATENT DOCUMENTS

AU    8939477 A    *    2/1990

*Primary Examiner*—Robert E. Pezzuto
*Assistant Examiner*—Nathan Mammen
(74) *Attorney, Agent, or Firm*—John William Stader; Larry W. Miller

(57) ABSTRACT

A mobile, self-propelled cotton harvester having a cotton module building or packaging capability, having at least one harvesting unit; a compactor structure including a first surface or floor having a predetermined extent and other surfaces such as side walls and ends defining and substantially enclosing an interior space or module building chamber for receiving the harvested cotton; and apparatus for distributing and compacting the cotton evenly within the interior space or chamber, including a compacting element or frame located therein, the compacting element supporting at least one member for movement relative thereto for distributing the cotton substantially evenly between the compacting element and the first surface, and at least one driver supporting the compacting element spaced from the first surface operable for moving it between positions spaced different distances from the first surface and for forceably moving it toward the first surface from the positions, respectively, and against cotton distributed therebetween for simultaneously and evenly compacting the cotton to form the cotton module or package.

20 Claims, 16 Drawing Sheets

U.S. PATENT DOCUMENTS

| | | | |
|---|---|---|---|
| 3,894,646 A | 7/1975 | Head et al. | 214/522 |
| 3,896,720 A | 7/1975 | Rhodes | 100/226 |
| 3,901,142 A | 8/1975 | Wood | 100/255 |
| 3,907,139 A * | 9/1975 | Luscombe | 100/100 |
| 3,941,047 A | 3/1976 | Orlando et al. | 100/100 |
| 3,961,572 A | 6/1976 | Johnston | 100/53 |
| 3,965,660 A | 6/1976 | Kanengieter et al. | 56/344 |
| 3,990,739 A | 11/1976 | Head | 296/56 |
| 4,024,967 A | 5/1977 | Dreier | 214/9 |
| 4,046,069 A | 9/1977 | Head | 100/255 |
| 4,060,028 A | 11/1977 | Luscombe | 100/100 |
| 4,072,242 A | 2/1978 | Cook | 214/522 |
| 4,184,425 A | 1/1980 | Haney et al. | 100/100 |
| 4,241,653 A | 12/1980 | Fagundes et al. | 100/100 |
| 4,278,016 A | 7/1981 | Haney et al. | 100/224 |
| 4,294,169 A | 10/1981 | Baird | 100/48 |
| 4,344,272 A | 8/1982 | Gandete et al. | 56/16.6 |
| 4,370,848 A | 2/1983 | Campbell et al. | 56/341 |
| 4,553,378 A * | 11/1985 | Fachini et al. | 56/16.6 |
| 4,635,544 A | 1/1987 | Taylor | 100/98 R |
| 4,888,940 A | 12/1989 | Deutsch | 56/16.6 |
| 4,930,297 A | 6/1990 | Schlueter et al. | 56/16.6 |
| 5,009,062 A * | 4/1991 | Urich et al. | 56/341 |
| 5,167,185 A | 12/1992 | Bass, III | 100/226 |
| 5,386,767 A | 2/1995 | Edinburgh | 100/48 |
| 5,479,766 A | 1/1996 | Ransom | 56/341 |
| 5,533,932 A | 7/1996 | Covington et al. | 460/119 |
| 5,540,144 A | 7/1996 | Schrag et al. | 100/188 R |
| 5,584,762 A | 12/1996 | Buhler et al. | 460/119 |
| 5,735,195 A * | 4/1998 | Hewitt et al. | 100/65 |
| 6,032,446 A * | 3/2000 | Gola et al. | 56/341 |
| 6,176,779 B1 | 1/2001 | Riesterer et al. | 460/119 |

* cited by examiner

MOBILE COTTON HARVESTER WITH COTTON MODULE BUILDING CAPABILITY

TECHNICAL FIELD

The present invention generally relates to mobile cotton harvesters, and, more particularly, to a mobile cotton harvester including on-board apparatus for receiving, distributing and compacting the cotton continually as it is harvested, for building or forming a unitary cotton module or portion of a unitary cotton module which will be freestanding and capable of being handled and transported without breaking apart or requiring further compaction.

BACKGROUND ART

Currently, cotton is typically harvested from plants by mobile cotton harvesters which include a relatively large basket for receiving and holding the harvested cotton. Many known cotton harvester baskets include apparatus for distributing and compacting the cotton therein to some extent, primarily to increase the amount of cotton which can be held in the basket.

Typical of such apparatus include a frame mounted in the upper region of the basket and carrying augers or other apparatus for distributing and compacting the cotton. Reference in this regard Nickla U.S. Pat. No. 3,412,532, issued Nov. 26, 1968 to International Harvester Company; Deutsch U.S. Pat. No. 4,888,940, issued Dec. 26, 1989 to Deere & Company; and Covington et al. U.S. Pat. No. 5,533,932, issued Jul. 9, 1996 to Case Corporation. For improved distribution of the cotton within the basket, it is also known to effect reversal of the rotational direction of the augers manually, or automatically using various devices including pressure sensors, optical level sensors, and timers. Reference in this regard, the above-referenced Deutsch patent; Buehler et al. U.S. Pat. No. 5,584,762, issued Dec. 17, 1996 to Case Corporation; and Riesterer U.S. Pat. No. 6,176,779B1, issued Jan. 23, 2001 to Deere & Company. Additionally, it is known to pivot the frame carrying the augers or other apparatus about a fixed point in the basket to compact the cotton downwardly and toward one end of the basket, as disclosed in the Nickla, Covington et al., and Buehler et al. patents referenced above.

However, an observed shortcoming of the use of the known augers located at a fixed position near the top of the basket is that the compaction by the augers occurs only when the cotton reaches the augers at which point the basket is nearly full, which results in only a minimal degree of compaction. Pivoting the frame carrying the augers downwardly into the basket has been found to achieve more satisfactory compaction for purposes of increasing basket capacity, but a shortcoming is that the compaction is uneven, due to the arcuate motion of the frame as a result of its pivotal connection. To better compact the cotton adjacent to the pivot end of the basket, the augers are typically directed to compact the cotton toward that end. However, by using two methods of compaction of the cotton, namely, compaction by the pivoting frame at one end of the basket and compaction by the augers toward the opposite end, satisfactory uniformity of compaction for the purposes of module building has not been achieved, and thus this is considered to be a shortcoming of the known constructions.

As a result, when the basket of the known harvesters is full, the cotton is typically then transferred or dumped into a cotton module builder, which is a device separate from the harvester and operable to tamp or compact and shape several basket loads of cotton into a large cotton module. Reference in this regard Haney et al. U.S. Pat. No. 4,184,425, issued Jan. 22, 1980 to Cotton Machinery Company, Inc. which discloses a representative cotton module builder utilizing a fluid operated tamper for compacting cotton movable longitudinally along the upper portion of a rectangular frame for receiving and holding the cotton, the tamper being positionable at incremental locations along the frame and vertically operable for tamping the cotton at those locations to a desired degree of compaction or density. Additionally, when the loads of cotton are dumped into the frame, the loads typically break apart and are unevenly distributed in the module builder frame. To level or even out the cotton, the tamper is typically lowered down into the cotton and pushed or dragged longitudinally therethrough to distribute the cotton more evenly. Once the cotton is more evenly distributed or leveled out, the tamper is then used to compact the cotton at incremental locations along the frame to form a rectangular cotton module using the frame as a mold, the tamping resulting in sufficient compaction of the cotton such that when removed from the frame, the module is substantially freestanding and retains a rectangular shape. This is effective, but is time and labor consuming, and thus is considered to be a less than optimal manner of producing a usable cotton module.

After being built, a cotton module is typically stored either in the field or in a suitable storage structure such as a barn or the like for as long as several months before the gin is able to receive and process it. Thus, the degree and uniformity of compaction of the cotton is desirably sufficient such that the module is able to retain at least substantially its rectangular shape without support, for the duration of storage, transport to the gin and other handling.

The above-discussed procedure, namely, harvesting the cotton, collecting and compacting it to some extent in a basket, transferring or unloading it from the basket into a module builder, then distributing the cotton within the module builder and moving the tamper along the frame and compacting the cotton to build a module, is time consuming, labor intensive, and costly.

Accordingly, what is sought is a mobile or self-propelled cotton harvester including a module building capability, which can harvest cotton and build the cotton into a cotton module "on the go", so as to eliminate or reduce many of the above-discussed handling steps between the harvesting of the cotton and the building of the cotton module, and eliminate the need for the traditional separate module builder, to thereby reduce the time and cost of handling the cotton.

SUMMARY OF THE INVENTION

What is disclosed is a mobile, self-propelled cotton harvester having an on the go cotton module building or packaging capability, which according to one aspect of the invention includes at least one harvesting unit for removing cotton from cotton plants as the harvester moves across a cotton field; a cotton receiver or compactor structure including a first surface which is preferably a floor having a predetermined extent and side walls and ends defining and substantially enclosing an interior space or module building chamber for receiving the cotton removed from the cotton plants; structure for conveying the removed cotton from the at least one harvesting unit into the interior space or chamber; and apparatus for distributing and compacting the cotton within the interior space, including a compacting element located in the interior space, the compacting element supporting at least one member operable for distributing cotton in contact therewith at least generally evenly relative to the first surface, and at least one driver connected to the compacting element and operable for moving the compacting element to positions spaced from the first surface where the at least one member can be operated to distribute the cotton at least generally evenly relative to the first surface, and the at least one driver being operable for forceably moving the compacting element and the at least one member along a predetermined path of movement from the positions, respectively, toward the first surface and against cotton distributed between the compacting element and the first surface for simultaneously and substantially evenly compacting the cotton against the first surface to form a cotton module or package.

DETAILED DESCRIPTION OF THE INVENTION

Figure 1:
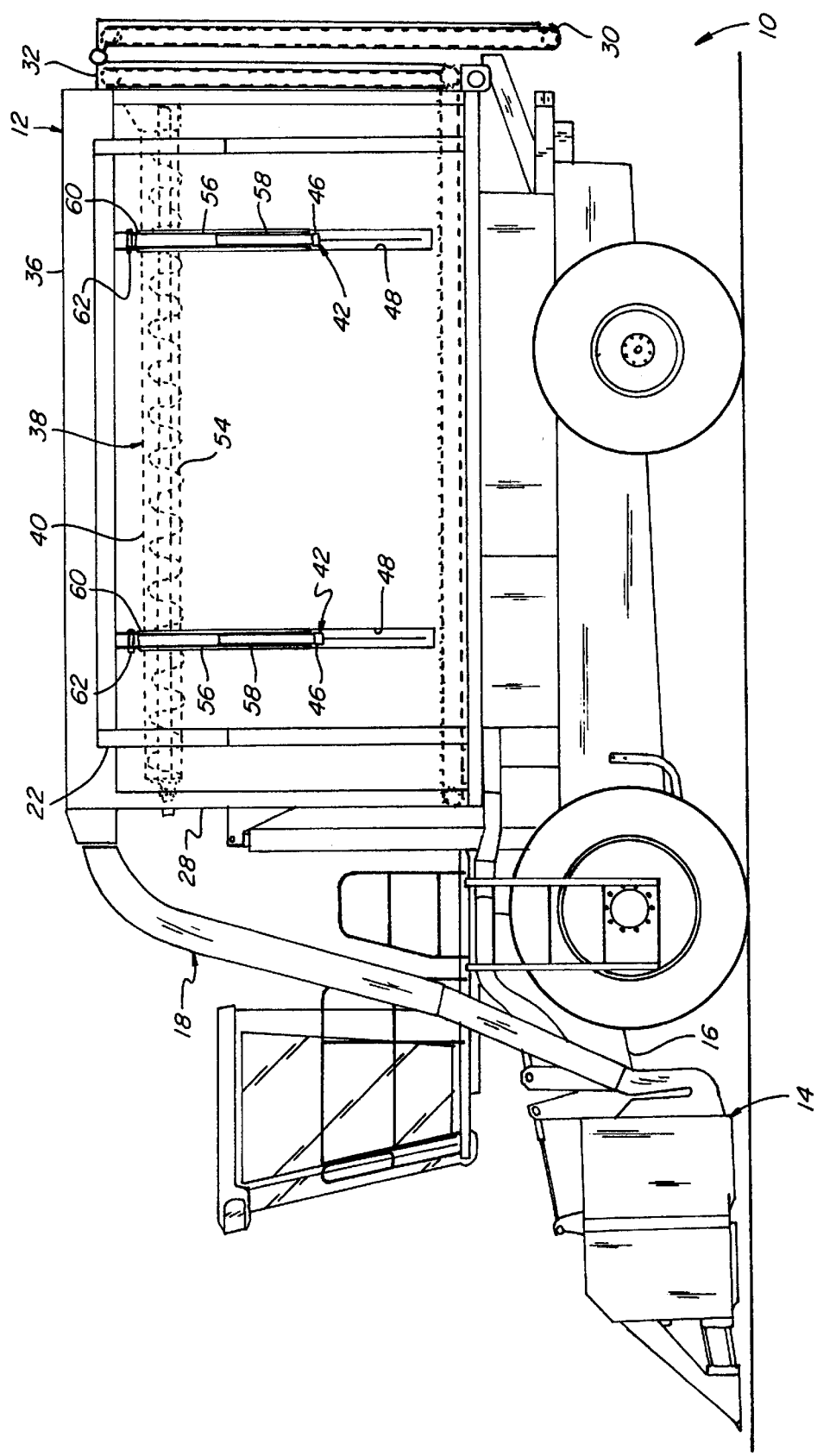
FIG. 1 is a side elevational view of a representative self-propelled mobile cotton harvester including apparatus for building a cotton module therein according to the present invention.

Referring now to the drawings, in FIG. 1, a typical conventional self-propelled mobile cotton harvester 10 is shown, including apparatus 12 for building a cotton module according to the teachings of the present invention, as the cotton is being harvested. Cotton harvester 10 includes a plurality of cotton harvesting row units 14 mounted transversely across a forward end 16 of harvester 10 in the conventional manner, for removing cotton from cotton plants of a cotton field as harvester 10 is driven in a forward direction over the field. After the cotton is removed from the cotton plants by row units 14, the cotton is conveyed through a cotton conveyor structure 18 from the row units 14 to apparatus 12.

Figure 2:
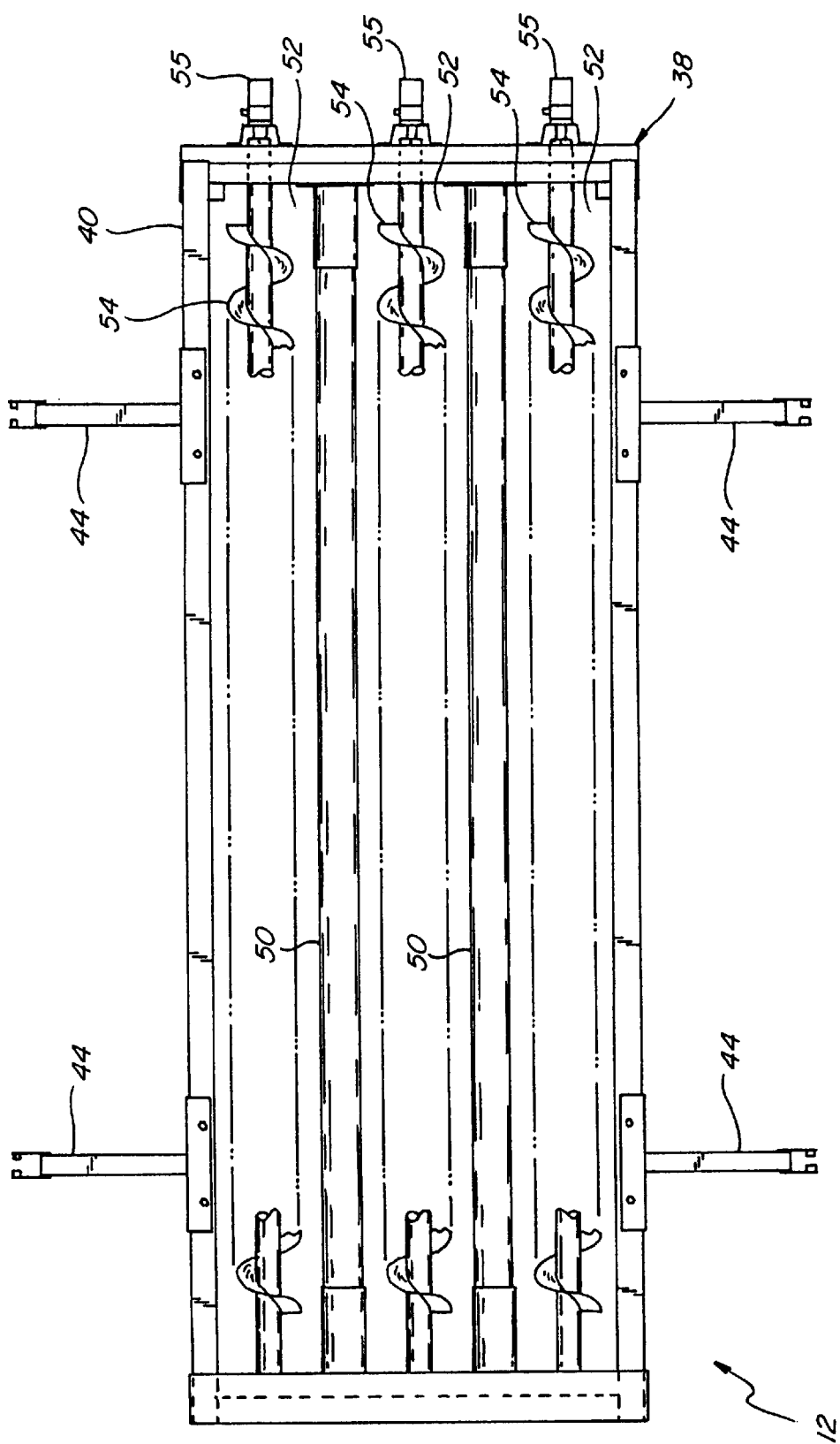
FIG. 2 is an enlarged top plan view of a frame and rotatable members of the apparatus of FIG. 1.
Figure 3:
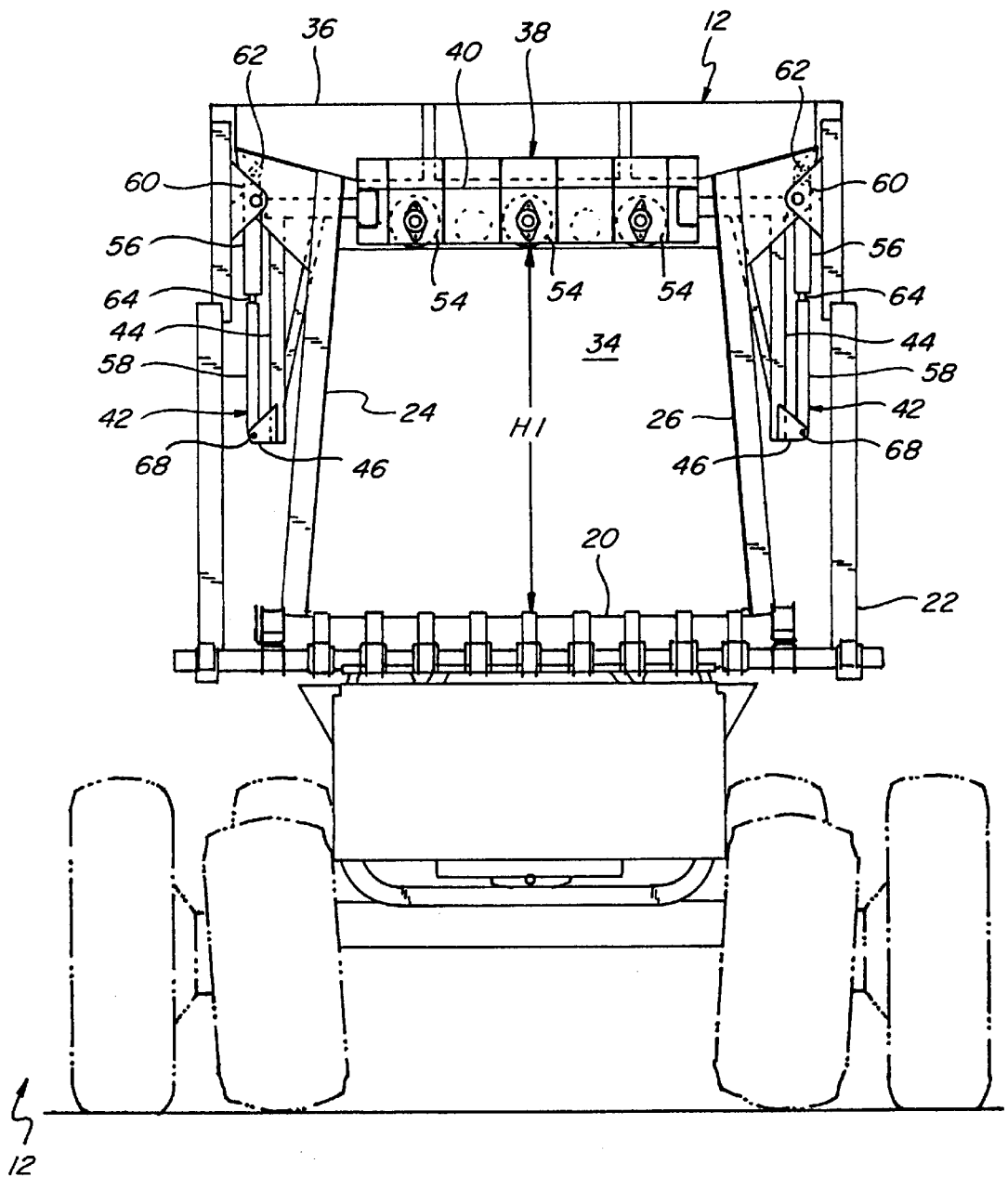
FIG. 3 is a rear elevational view of the mobile cotton harvester of FIG. 1, with a rear gate of the apparatus of the invention removed to show internal aspects thereof including a cotton module building chamber and a cotton distributor and compactor in an initial retracted position within the chamber.

Referring also to FIGS. 2 and 3, instead of a conventional cotton receiving basket, apparatus 12 for building the cotton module segment includes module building chamber 34 formed by a first surface which is preferably a rectangular, generally horizontal floor 20 having a predetermined horizontal extent in a forward to rearward direction and in a side to side direction transverse or perpendicular to the forward to rearward direction, and a structural frame 22 extending upwardly relative to floor 20 and supporting opposed side walls 24 and 26 which extend upwardly and convergingly from floor 20, side walls 24 and 26 terminating at a location about equal to or greater than a predetermined height Hi above floor 20. A forward wall 28 extends upwardly along a forward peripheral edge of floor 20 between side walls 24 and 26, a distance corresponding about to the height of walls 24 and 26. A folding gate structure 30 is connected to apparatus 12 along a rearward peripheral edge of floor 20. Gate structure 30 is foldable or retractable, as shown in FIG. 1, to position a first segment 32 thereof so as to extend upwardly relative to floor 20 to serve as a wall enclosing a rearward end of an interior space formed and defined by walls 24, 26 and 28, which space comprises the module building chamber 34. The upper portion of chamber 34 is covered by a roof structure 36 supported by structural frame 22, cotton conveyor structure 18 terminating at an opening (not shown) beneath roof structure 36 such that the harvested cotton conveyed through conveyor structure 18 will be introduced into chamber 34 at a high location.

A cotton distributor and compactor 38 includes a rectangular frame 40 supported or suspended in chamber 34 by a plurality of drivers 42 operable for moving compactor 38 upwardly and downwardly relative to floor 20 along a predetermined path of movement for positioning compactor 38 at various locations or positions within chamber 34 for distributing the cotton at least generally evenly therewithin with respect to floor 20, and for forceably and evenly driving compactor 38 against substantially all of the cotton distributed on floor 20 simultaneously. Here, four drivers 42 are utilized at spaced locations along side walls 24 and 26 externally to chamber 34 to provide the desired positioning and driving capabilities, although it should be recognized that other arrangements including a greater or lesser number of drivers or different drivers could likewise be used, as long as compactor 38 can be positioned thereby for distributing the cotton evenly within chamber 34 and forceably driven against the cotton to evenly compact it to the required extent. It is also preferred that compactor 38 follow an upwardly and downwardly generally linear path of movement relative to floor 20 which is at least generally perpendicular to floor 20, or at no more than a small acute angle deviation from perpendicular thereto, and, it is preferred that compactor 38 be oriented generally parallel to floor 20, or at no more than a small acute angle deviation from parallel thereto. The preferred generally perpendicular path of movement and generally parallel orientation of compactor 38, or the no more than small deviations from those relationships relative to floor 20, are desirable as they have been found to be significant factors in obtaining the desired evenness of compaction of the cotton and integrity of modules built by the present apparatus, as well as the stability or ability of the module to retain a desired generally rectangular shape over an extended period of time after removal from chamber 34. However, it should be recognized that some deviation of the path of movement of compactor 38 from the preferred perpendicular to floor 20 and/or of compactor 38 from the preferred parallel to floor 20 are expected and are permissible, due for instance to fluid system irregularities and the like as discussed below, as long as the resulting module has the desired integrity and shape retaining capability. Further, it is anticipated that for some applications wherein a module is to be stored outdoors, it may be desirable for the top surface of the module to have a sloped or curved shape such that rain water, dew, and other moisture will run off of the module. To form a module having such a sloped top surface, it is contemplated that compactor 38 can optionally be oriented at a small acute angle relative to floor 20 so as to impart the desired slope to the module. To form such a curved shape, compactor can optionally have a surface or region for contacting the cotton which has a correspondingly curved shape.

Each driver 42 is preferably connected to frame 40 by an inverted L-shape arm structure 44 having a generally upright leg portion connected to a lower end 46 of the driver 42, and a generally horizontal portion which extends through a generally vertical slot 48 through the corresponding side wall 24 or 26 and connects to frame 40, which arrangement is desirable as it allows the overall height of apparatus 12 to remain the same regardless of the position of frame 40 in chamber 34. Each slot 48 preferably includes elements such as brushes, rubber flaps or boots, collapsible membranes, or the like, which permit longitudinal movement of arm structure 44 therein while preventing escape of significant quantities of cotton from chamber 34. Frame 40 is positioned in chamber 34 beneath the outlet of cotton conveyor structure 18, such that the cotton will be introduced into chamber 34 above frame 40. Frame 40 supports or carries a plurality of longitudinally extending structural elements such as tubes 50 defining elongate upwardly facing openings 52 through frame 40 for the passage of cotton therethrough. Frame 40 supports an elongate auger 54 in each space 52, for rotation about a longitudinal axis extending therethrough. Each auger 54 is rotatable by a conventional hydraulic motor 55 or other suitable conventional rotating apparatus in a first rotational direction for moving or distributing cotton beneath the auger that comes into contact therewith in a first longitudinal direction, and in an opposite rotational direction for moving or distributing the cotton beneath the auger in the opposite longitudinal direction. Additionally, when augers 54 are rotated, any loose cotton on top of the augers, including cotton ejected from cotton conveyor structure 18 onto the augers and frame 40, will be carried by the respective augers therearound to beneath the augers and forced or integrated into the collected cotton therebeneath. In this way, cotton distributor and compactor 38 can operate "on the go", that is, continually distribute the cotton as it is harvested and received in chamber 34. Here, it should be noted that a harvester such as harvester 10 can harvest up to several hundred pounds of cotton crop per minute, and thus it is highly desirable that compactor 38 have the capability for passage of significant quantities of cotton therethrough and the ability of integrating the cotton into cotton located in chamber 34 below.

Referring to FIGS. 3–12, in FIG. 3, cotton distributor and compactor 38 is shown in an uppermost or retracted position which locates the bottom of frame 40 of compactor 38 a distance H1 above floor 20. As shown in FIGS. 4–11, drivers 42 are operable for lowering cotton distributor and compactor 38 to one or more positions in chamber 34, including a start position and a plurality of indexing positions beneath or less than height H1 above floor 20, such that augers 54 can be rotated to distribute cotton in chamber 34 at least generally evenly over floor 20. As discussed above, it is preferred that compactor 38 be at least generally parallel to or at no more than a small acute angle from parallel to floor 20 when at the respective indexing positions, such that augers 54 will be similarly parallel to floor 20 or at the same small acute angle from parallel so as to be able to better distribute the cotton evenly with respect to floor 20. Drivers 42 are also operable when compactor 38 is at any of the indexing positions for forceably driving compactor 38 downwardly from the indexing position against the collected and distributed cotton beneath frame 40 with a sufficient force to achieve substantially even compaction of the cotton to form the cotton into a unitary free standing module. Again, during the compaction, and at least at maximum compaction, it is preferred that compactor 38 be at least generally parallel to floor 20 or within only a small acute angle deviation from parallel, to achieve more even compaction over the horizontal extent of the cotton on floor 20. Drivers 42 shown each include two fluid cylinders, including an indexing cylinder 56 and a compacting cylinder 58. Each indexing cylinder 56 has an upper end 60 which comprises the upper end of the driver 42 and is connected by a pin 62 to an element of structural frame 22. Each cylinder 56 includes a rod 64 extending downwardly therefrom and extendible into and retractable from the cylinder in the conventional manner by a fluid control circuit of a control system 80 (FIG. 13) which provides pressurized fluid to cylinders 56 substantially evenly, using divider valves or the like (not shown), so as to be operable for simultaneously extending and retracting rods 64. Compacting cylinder 58 of each driver 42 is mounted to a lower end of rod 64 of indexing cylinder 56. Each compacting cylinder 58 includes a rod 66 (FIG. 5) extendible therefrom and retractable therein by the introduction of pressurized fluid into cylinder 58 from a fluid control circuit, which can also be, for instance, a master/slave circuit including two or more of the cylinders 58, or a separate fluid feed to each cylinder 58, so that rods 66 are simultaneously extended and retracted, the lower end of each rod 66 comprising lower end 46 of that driver 42 and being connected to arm structure 44 by a pin 68.

Here, it should be noted that it is a principle goal of the present invention to uniformly distribute and adequately compact the cotton received in chamber 34 sufficiently to form a unitary cotton module, or at least a segment or portion of a cotton module, which, when removed from chamber 34, will have and retain a generally quadrangular cross-sectional shape and size essentially as required or desired for processing by a conventional cotton gin in a manner comparable or similar to that for processing a traditionally built cotton module. In pursuit of this goal, the extent or width of floor 20 between side walls 24 and 26 preferably conforms approximately to the width of a traditional module builder frame, the extent of floor 20 between forward wall 28 and gate structure 30 preferably conforms to at least a portion of the length of a traditional module builder frame, and walls 24, 26, and 28 and gate 30 preferably have a sufficient height or vertical extent, such that a cotton module or segment thereof built in the present apparatus 12 will be substantially similar dimensionally to at least a traditionally built cotton module or segment of a cotton module. The length of floor 20 of apparatus 12 shown is approximately 16 feet which is one half of the length of the frame of a traditional module builder, and about 7 feet wide at the bottom which corresponds to the width of a conventional module, such that two modules built by apparatus 12 can be placed end-to-end to equal a conventionally built cotton module in length. However, it should be understood that cotton modules having other lengths, both shorter and longer than the present length, can be used and are thus contemplated according to the invention. It should also be noted that walls 24 and 26 extend convergingly in the upward direction. This is done intentionally, as it is anticipated that a module built using apparatus will expand when removed from chamber 34, and by compacting the cotton to this shape, when removed the module will gradually assume a more desired generally rectangular shape. In this regard, walls 24 and 26 each extend inwardly into chamber 34 by 1 inch for each foot of rise.

As will be shown, use of the present apparatus can significantly reduce or eliminate aspects of the previously required steps of compacting several basket loads of cotton in a conventional cotton receiving basket, transporting and unloading each of the loads to a traditional cotton module builder, moving the tamper along the frame to distribute and level the cotton, and then tamping or compacting the cotton in the module builder incrementally along the length thereof to obtain a conventional cotton module. Using apparatus 12, a cotton module can be built continuously as the cotton is harvested, which is advantageous both timewise and costwise, particularly due to the elimination of the need for the traditional module builder and multiple trips between the harvester and the module builder. The degree of compaction and density achieved using the present apparatus has also been found to be sufficient such that the module formed will have a water repellant property in some instances, such that modules can be stored outdoors without suffering degradation and water damage.

Here also, it should be noted that by use of apparatus 12 it is desired to build a cotton module that is more uniformly distributed and compacted, that is, the cotton at any level within the module will be substantially evenly distributed and subjected to substantially the same degree of compaction, so as to have substantially the same density across the module at any selected height. This can be important during long storage periods as a more evenly compacted module will have a tendency to better retain its rectangular shape and not tilt to one side or end and/or break apart when handled and transported. Also, a more uniformly compacted module can be more easily processed at the cotton gin. In this regard, frame 40 of compactor 38 is only marginally smaller in horizontal extent than floor 20 both lengthwise and widthwise, such that substantially all of the cotton beneath frame 40 is simultaneously and evenly compacted thereby. In this respect, it is recognized that when multiple fluid cylinders such as cylinders 56 and 58 are used to perform an indexing or compacting function, the cylinders being simultaneously operated may not extend or retract at exactly the same rate, due for instance, to differing weights being raised or lowered by the individual cylinders, such as due to the location of various elements of compactor 38 nearer one end or side thereof compared to another; various opposing forces encountered, for instance, due to the location of more cotton under one end or side of the compactor; and/or different fluid delivery rates and pressures for the individual cylinders, due to the fluid circuitry involved or proximity to the pressurized fluid source. Thus, compactor 38 may not be maintained precisely parallel to floor 20 or follow a perfectly linear path perpendicular to floor 20 when moving and engaged with the underlying cotton. However, as long as the orientation and path of movement used achieve a sufficiently uniformly compacted module which has the desired integrity and shape retention properties, they will be acceptable for the purposes of the present invention.

Here also, it should be understood that although the various aspects of the operation of apparatus 12 are preferably automatically operated, they can alternatively be selectably manually operated or semi-automatically operated, as desired. The operation mode can also be operator selectable, as desired, using selector switches located in the operator cab or elsewhere, as desired.

Figure 4:
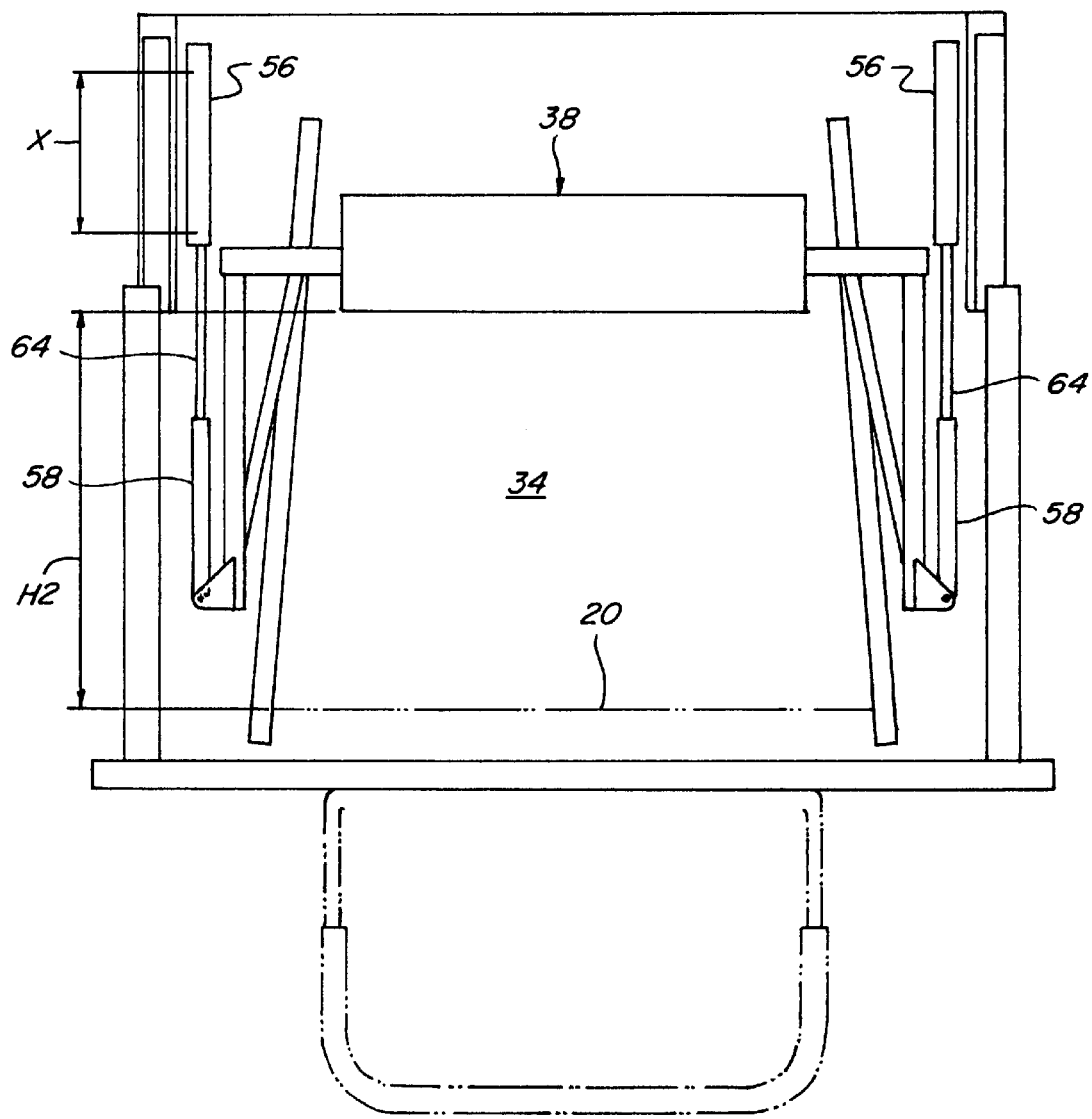
FIG. 4 is a simplified schematic rear view representation of the mobile cotton harvester and apparatus of the invention with the cotton distributor and compactor in a compacting start position in the cotton module building chamber.
Figure 11:
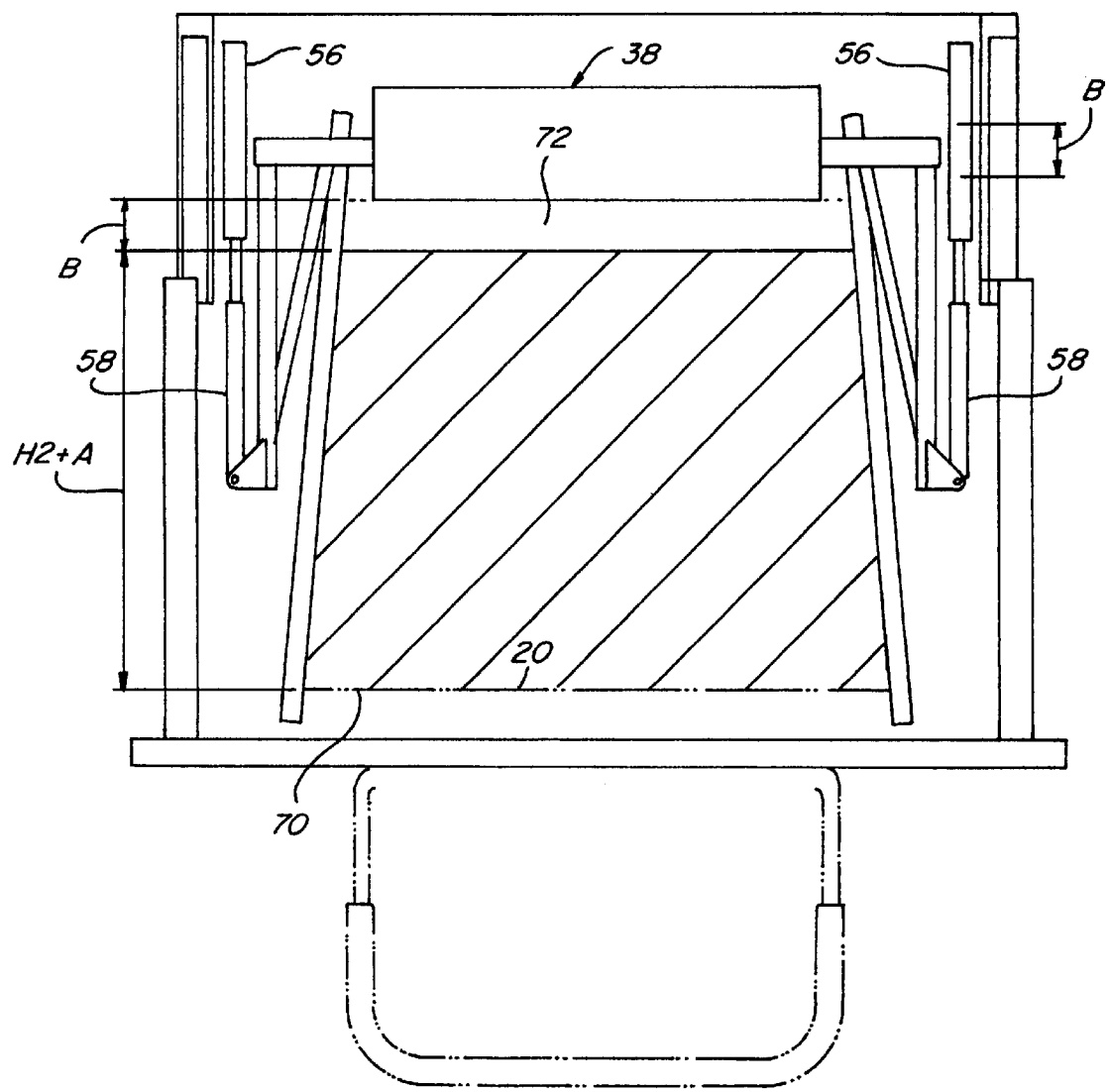
FIG. 11 is another simplified schematic representation of the mobile cotton harvester and apparatus of the invention with the compactor raised to a third position in the chamber.
Figure 12:
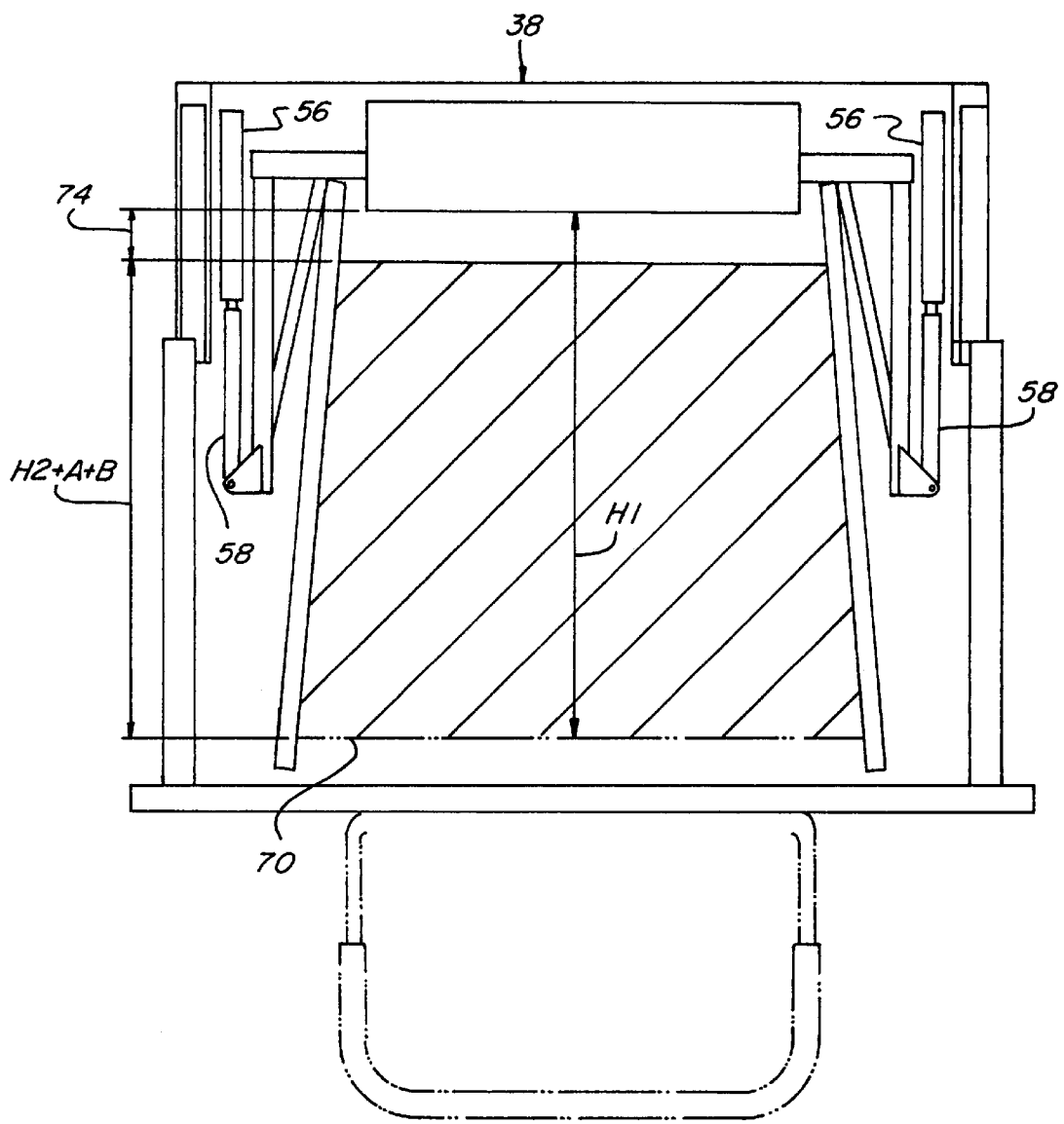
FIG. 12 is another simplified schematic representation of the mobile cotton harvester and apparatus of the invention with the cotton module built up to the third position and the compactor retracted to the initial retracted position of FIG. 3.
Figure 13:
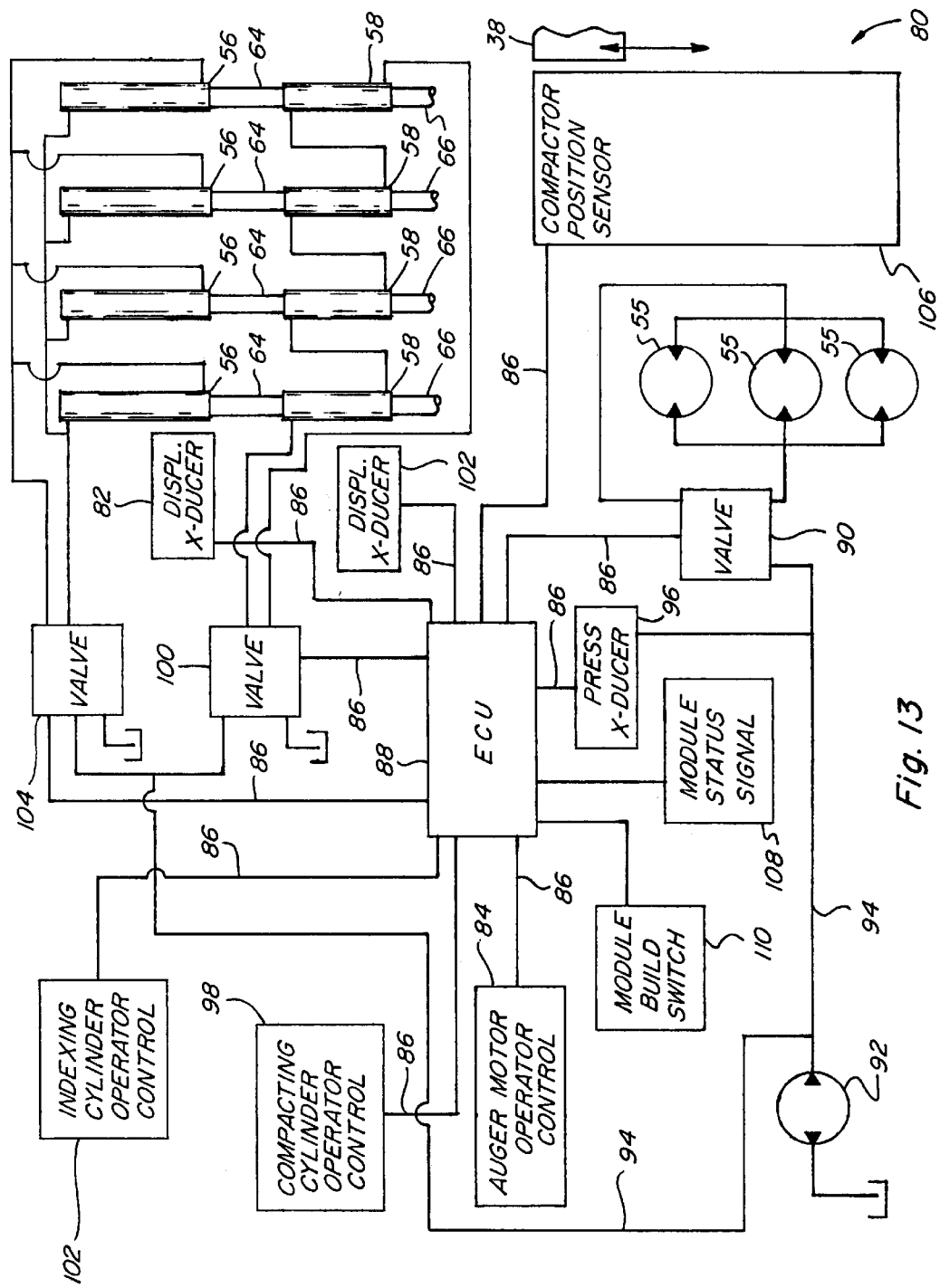
FIG. 13 is a simplified diagrammatic representation of a control system for the present invention.

Referring now to FIGS. 4—13, illustrative steps of a preferred method of operation of apparatus 12 for building a cotton module in chamber 34, as cotton is being harvested by row units 14 and continually conveyed into module building chamber 34, are shown (FIGS. 4–12), along with a representative diagram showing elements of a control system 80 for performing the steps (FIG. 13). Referring first to FIGS. 4 and 13, compactor 38 is initially moved from the initial retracted position shown in FIG. 3 to a first indexing or compacting start position as shown, a distance H2, which is equal to H1–X, above floor 20 by simultaneously fully extending rods 64 of indexing cylinders 56, by the amount X, with compacting cylinders 58 remaining fully retracted. This can be done manually by the operator, or automatically, as will be explained. The amount X, as well as the other displacements of cylinders 56 can be detected or determined using any suitable conventional means, such as one or more conventional displacement sensors located in cylinders 56 or externally thereto, represented by displacement transducer 82 in FIG. 13, or an optical detector, proximity detector, or the like. At the start of operation, augers 54 are rotated in a rotational direction for moving cotton therebeneath forwardly. Rotation of augers 54 is initiated by an auger motor control 84 which is preferably a three position switch located in the operator cab of harvester 10 and connected by a conductive path 86 to a processor based electronic control unit (ECU) 88 of system 80, ECU 88 being connected via conductive path 86 to a three way solenoid valve 90 or other valve arrangement disposed in connection with auger motors 55 and a fluid pump 92 via a fluid path 94 operable for reversing direction of rotation of auger motors 55. The forward direction of rotation of augers 54 is selected as the cotton entering chamber 34 is blown to the rearward end therein and it is thus desired to first distribute cotton accumulating in the rear end of chamber 34 forwardly. It is desired to distribute the cotton in chamber 34 at least generally evenly and more preferably substantially evenly over floor 20 and to achieve this it is good to also rotate augers 54 for distributing the cotton rearwardly, and then possibly forwardly again, or alternatingly forwardly and rearwardly. This can be done manually by the operator using control 84 while viewing the cotton in chamber 34, a yield monitor for cotton flow, or automatically by ECU 88 using inputs from a pressure transducer 96 connected to fluid path 94 and operable for monitoring fluid pressure in auger motor 55 and outputting a signal representative thereof to ECU 88 over conductive path 86, ECU effecting the reversal of the direction of rotation of fluid motors 55 by sending a control signal to valve 90 when the output signals received indicate a predetermined pressure condition representative of conditions in chamber 34 wherein reversal is required or desired. Reversal can also be effected by other means, such as by use of a timer connected to or in ECU 88 to effect reversal after some elapsed time, or other condition is met.

As cotton begins to fill chamber 34, the fluid pressure in motors 55 will rise in response to increased resistance to movement of augers 54 in the cotton. This fluid pressure can be monitored by transducer 96, and when it reaches a predetermined level, a compacting stroke by compacting cylinders 58 is initiated, again, either manually by an operator using a compacting cylinder operator control 98, or automatically. Control 98 can be for instance a two position turn/push switch connected to ECU 88 via conductive path 86.

Figure 5:
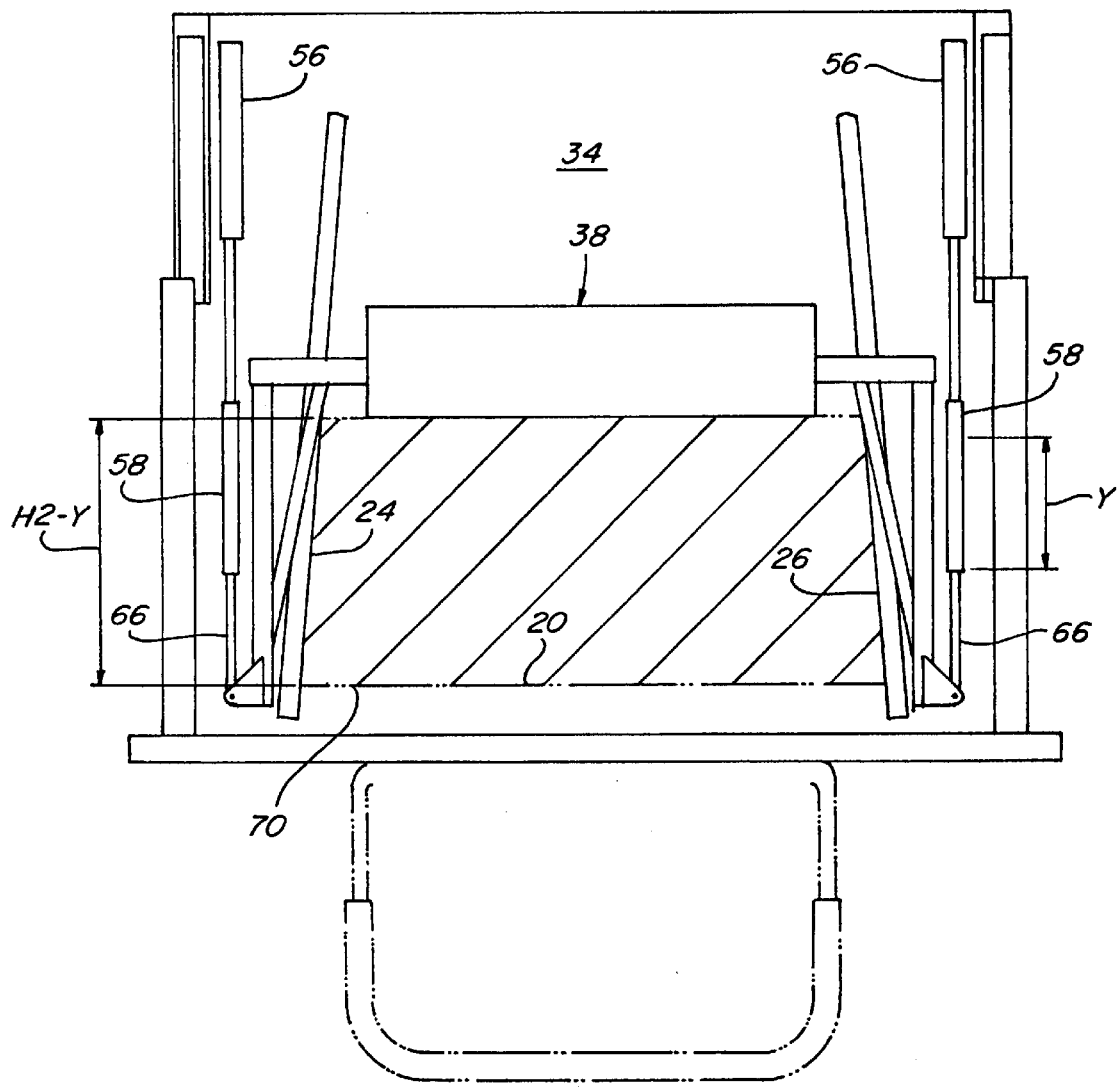
FIG. 5 is another simplified schematic rear representation of the mobile cotton harvester and apparatus of the invention with the cotton distributor and compactor lowered to a fully extended compacting position in the chamber.

Referring to FIGS. 5 and 13, the downward compacting stroke by compacting cylinders 58 from the start position can be activated manually by the operator moving the switch of control 98 to a manual position and pushing the switch which will send a signal to ECU 88 to stroke compacting cylinders 58 one time. In the first compacting stroke, rods 66 of cylinders 58 will be simultaneously fully extended by the amount Y, while indexing cylinders 56 remain fully extended, such that compactor 38 will be moved downwardly to a first compacting position a distance H2-Y above floor 20, to substantially evenly compact the cotton beneath compactor 38 into a partial cotton module segment 70. To accomplish this, ECU 88 sends a control signal to a solenoid control valve 100 or the like via conductive path 86 to direct fluid under pressure through fluid path 94 from pump 92 to cylinders 58 to extend rods 66, and then to retract rods 66 when a fluid pressure in cylinders 58 reaches a predetermined pressure as detected by pressure transducer 96 or rods 66 reach a desired degree of extension as determined by an optional displacement transducer 102 connected to ECU 88 by conductive path 86, to complete a compacting cycle. With control 98 switched to the automatic position instead of the manual position, ECU 88 can initiate the compacting stroke when the output signal from transducer 96 reaches a predetermined value.

Figure 6:
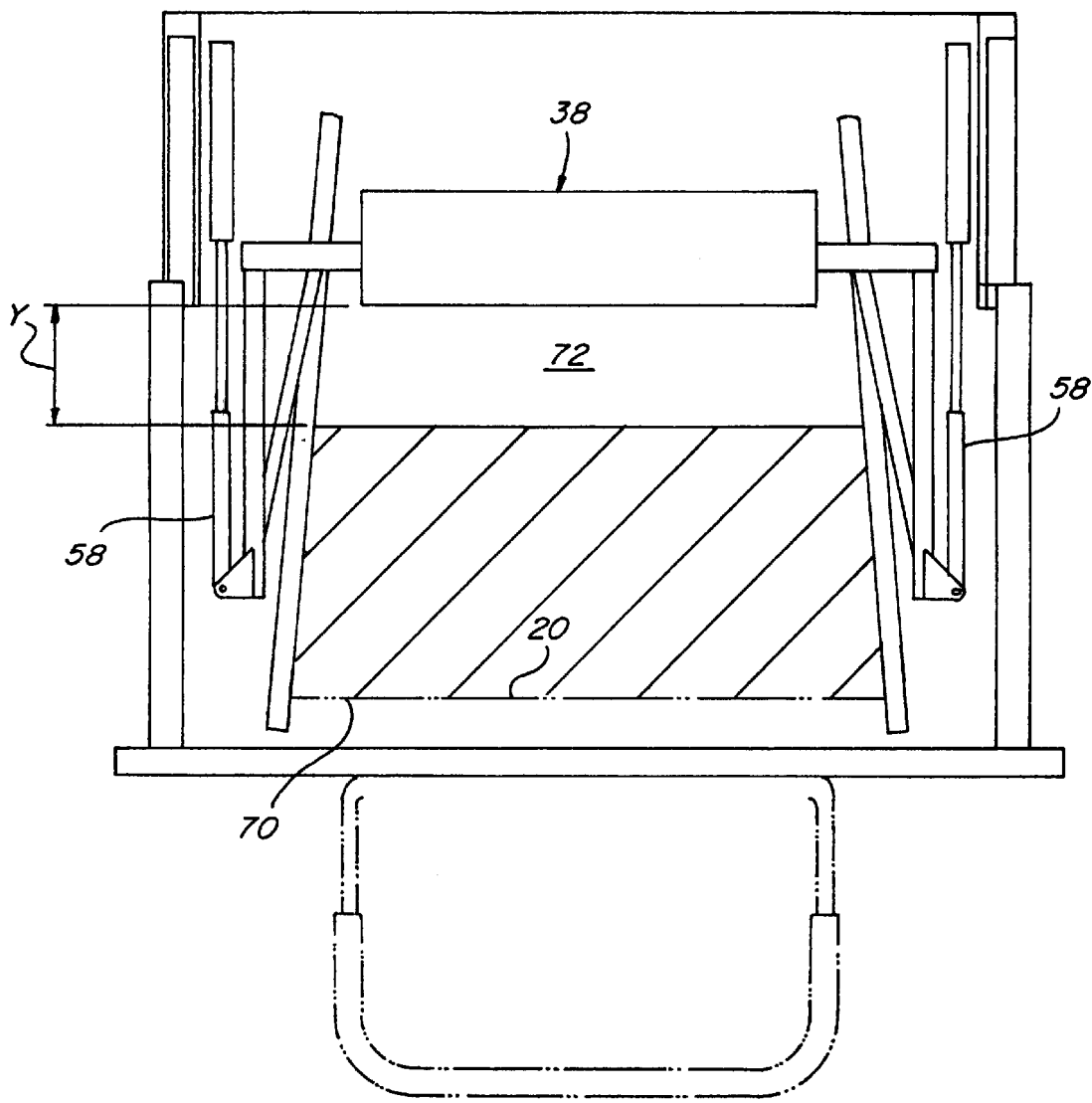
FIG. 6 is another simplified schematic representation of the mobile cotton harvester and apparatus of the invention with the compactor raised from the initial compacting position with a cotton module built to the level of the fully extended compacting position.

Referring to FIG. 6, after completion of the compacting cycle a void area 72 is present above module 70 for cotton to fill. Rotation of augers 54 in a direction reverse of the last previous direction is now initiated, either manually, or automatically by ECU 88 in the above described manner. The direction of rotation of augers 54 can be reversed one or more times to evenly distribute the cotton in chamber 34, as above. As the cotton is compacted by augers 54, the auger motor pressure will build again and when the auger motor pressure reaches a predetermined or set pressure value as detected by transducer 96, the rotation of augers 54 is preferably stopped and another compacting stroke is made, extending rods 66 of compacting cylinders 58 simultaneously by an amount up to the amount Y, such that compactor 38 will again be moved downwardly to the first compacting position a distance H2-Y or higher above floor 20 to again compact the cotton substantially evenly beneath compactor 38 into the partial cotton module segment 70. Here, it should be noted that the degree of compaction in subsequent compacting strokes is not expected to reach the full value H2-Y due to the greater amount of cotton now comprising module segment 70. Compacting cylinders 58 are then fully retracted thereby completing another compacting cycle and again lowering the auger motor pressure when rotated, leaving the remaining portion of void area 72 above module 70 to be filled.

This sequence of steps, namely, augering the cotton in area 72 to at least generally evenly distribute the cotton over module segment 70, performing a compacting cycle when the auger motor pressure reaches a predetermined value, and then resuming augering, is repeated until the auger motor pressure during auger rotation stays above the predetermined value after a compacting cycle, the rotational direction of augers 54 being reversed after each compacting cycle, and the compacting stroke shortening after successive compacting cycles, due to the build up of module segment 70. It should be noted that it is preferred that augers 54 at least momentarily pause and not be rotating when reversed so as to avoid sending a pressure spike through the hydraulic system. Also, it has been found that when rotating augers are forced into highly compacted cotton the auger motor pressure is raised significantly, to the relief pressure for the motors, such that rotation will be stopped due to that pressure. Thus, for this reason it may be desired to halt rotation of augers 54 when the compacting stroke is initiated and throughout the compacting cycles.

Figure 7:
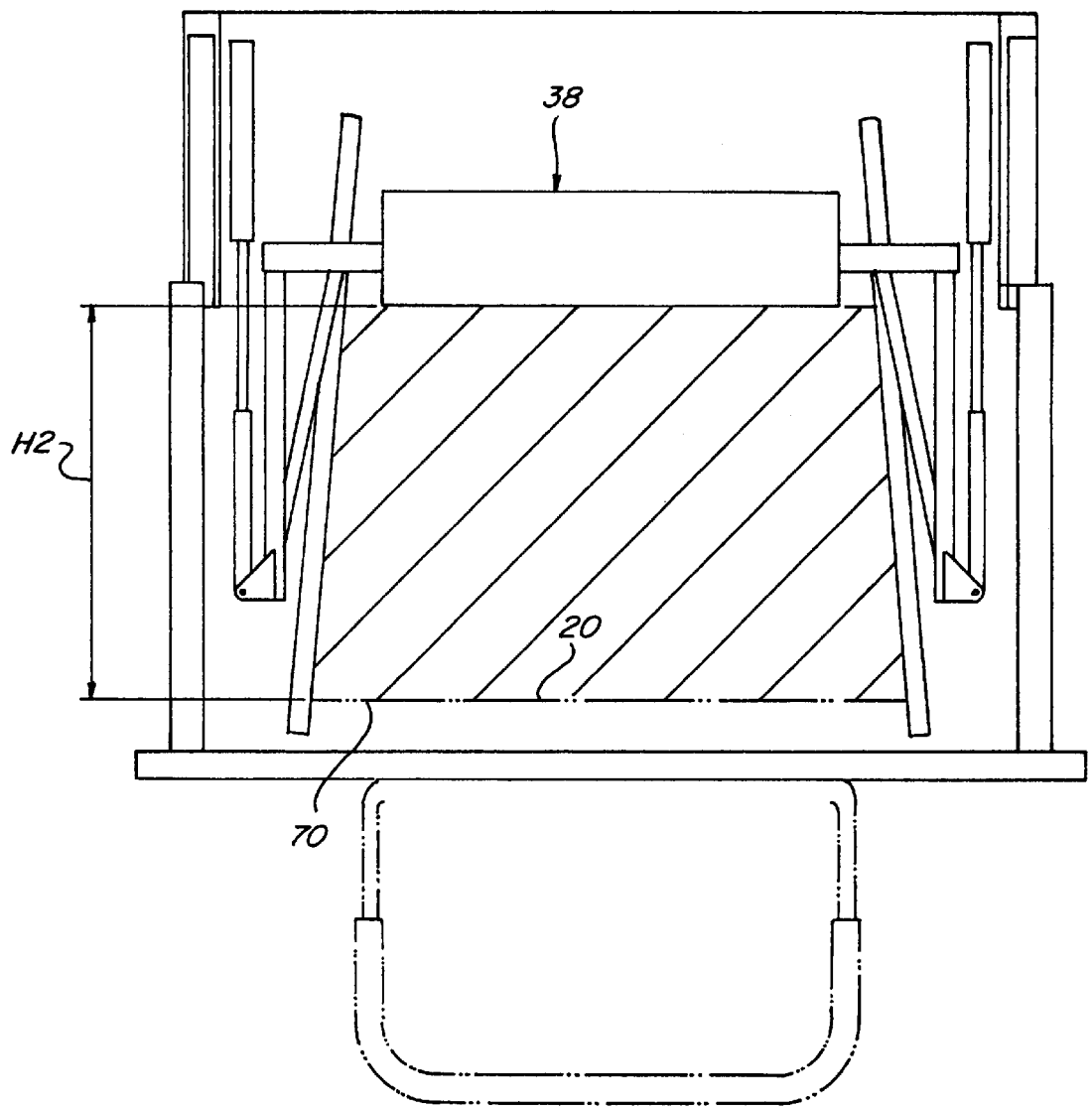
FIG. 7 is another simplified schematic representation of the mobile cotton harvester and apparatus of the invention with a cotton module built to the level of the compactor when in the first position.

Module building using compacting cylinders 58 from the start position is preferably signaled as complete when the auger motor pressure during rotation of the augers stays above the predetermined value after a compacting cycle, that is compacting cylinders 58 are extended to the extent possible given the operating pressure thereof and retracted, which signals that module segment 70 has reached a desired degree of compaction and height beneath compactor 38 approximately equal to the start position, or about the distance H2 above floor 20, as shown in FIG. 7. Alternatively, completion at the start position can be determined by other means, for instance, by an optical detector, by an elapsed time, by the completion of a predetermined number of compacting cycles, by the completion of a compacting stroke of a predetermined minimum length or time duration, by a combination of these, for instance, a predetermined number of compacting cycles within a predetermined time period, visually, or when some other desired condition is met.

Figure 8:
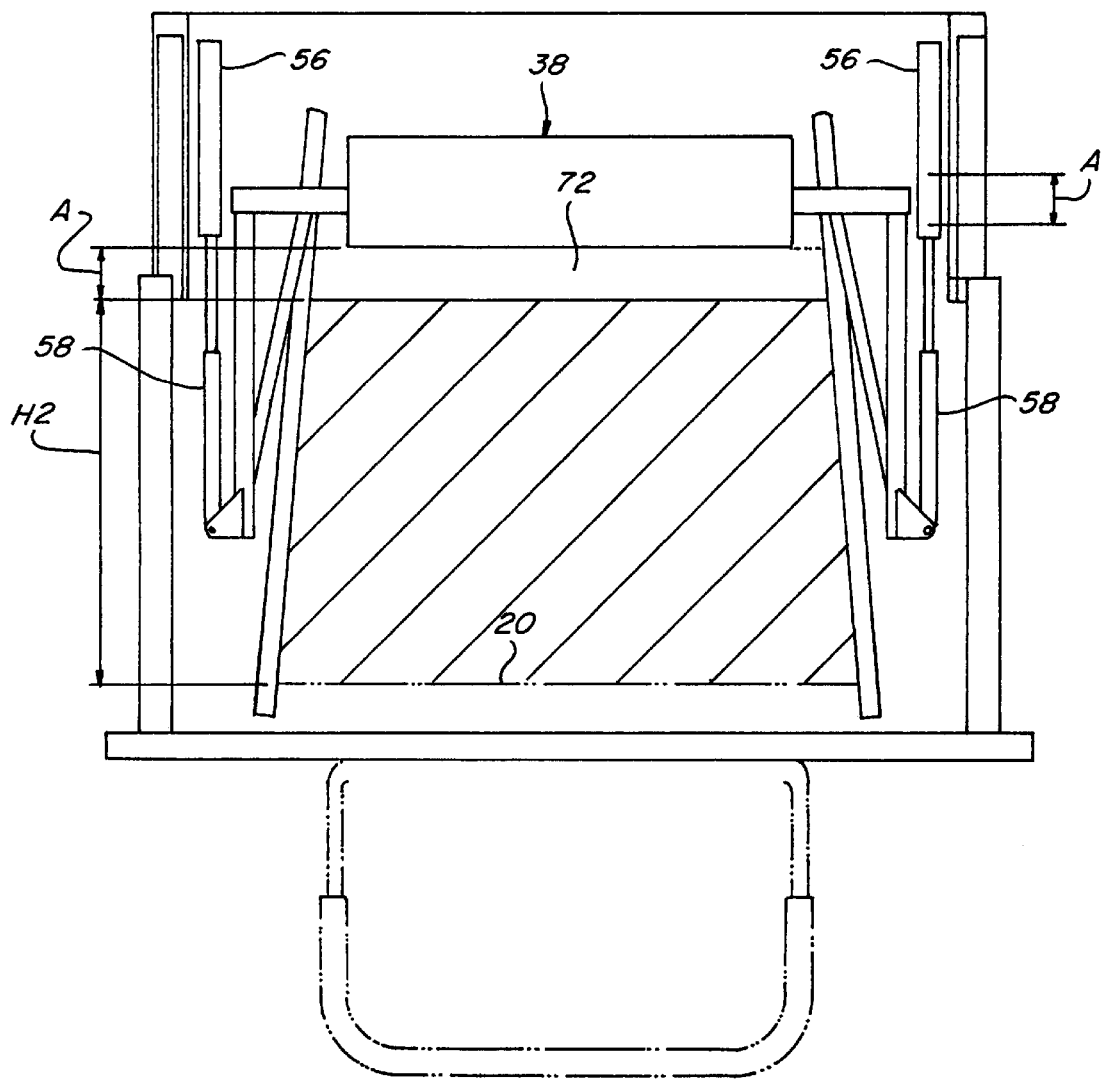
FIG. 8 is another simplified schematic representation of the mobile cotton harvester and apparatus of the invention with the compactor raised to a second position.

Then, referring to FIGS. 8 and 13, indexing cylinders 56 will be activated to retract by a predetermined amount A to position compactor 38 at second indexing position a distance H2+A above floor 20 to create a new void area 72 to be packed with cotton. This can be accomplished either manually by an operator using an indexing cylinder operator control 102, or automatically. Control 102 can be for instance another two position turn/push (momentary contact or similar) switch connected to ECU 88 via conductive path 86. The upward indexing movement by indexing cylinders 56 is activated manually by the operator moving the switch of control 102 to a manual position and pushing the switch which will send a signal to ECU 88 to retract indexing cylinders 56 and when the desired position is reached the switch is released to halt the upward movement. The position can be determined visually or using a sensor or detector operable to determine the position of indexing cylinders 56 or compactor 38, such as a compactor position sensor 106 connected to ECU 88 via conductive path 86. For automatic operation, control 102 can be moved to the automatic position such that ECU 88 can determine the displacement of rods 64 of cylinders 56 using displacement transducer 82 which will output a signal representative thereof to ECU 88 via conductive path 86, such that, in turn, ECU 88 can send a control signal to a solenoid control valve 104 or the like via conductive path 86 to direct fluid under pressure through fluid path 94 from pump 92 to cylinders 56 to retract rods 64 by the appropriate amount. This can be initiated when a signal received from compactor position sensor 106 has detected compactor 38 at position H1 and transducer 96 is sending a signal indicating that auger motor pressure is at the predetermined level for compacting after a compacting cycle. Due to the presence of new void area 72, the auger motor pressure will be lower during rotation of augers 54, and again, the rotation of auger 54 will be reversed.

Figure 9:
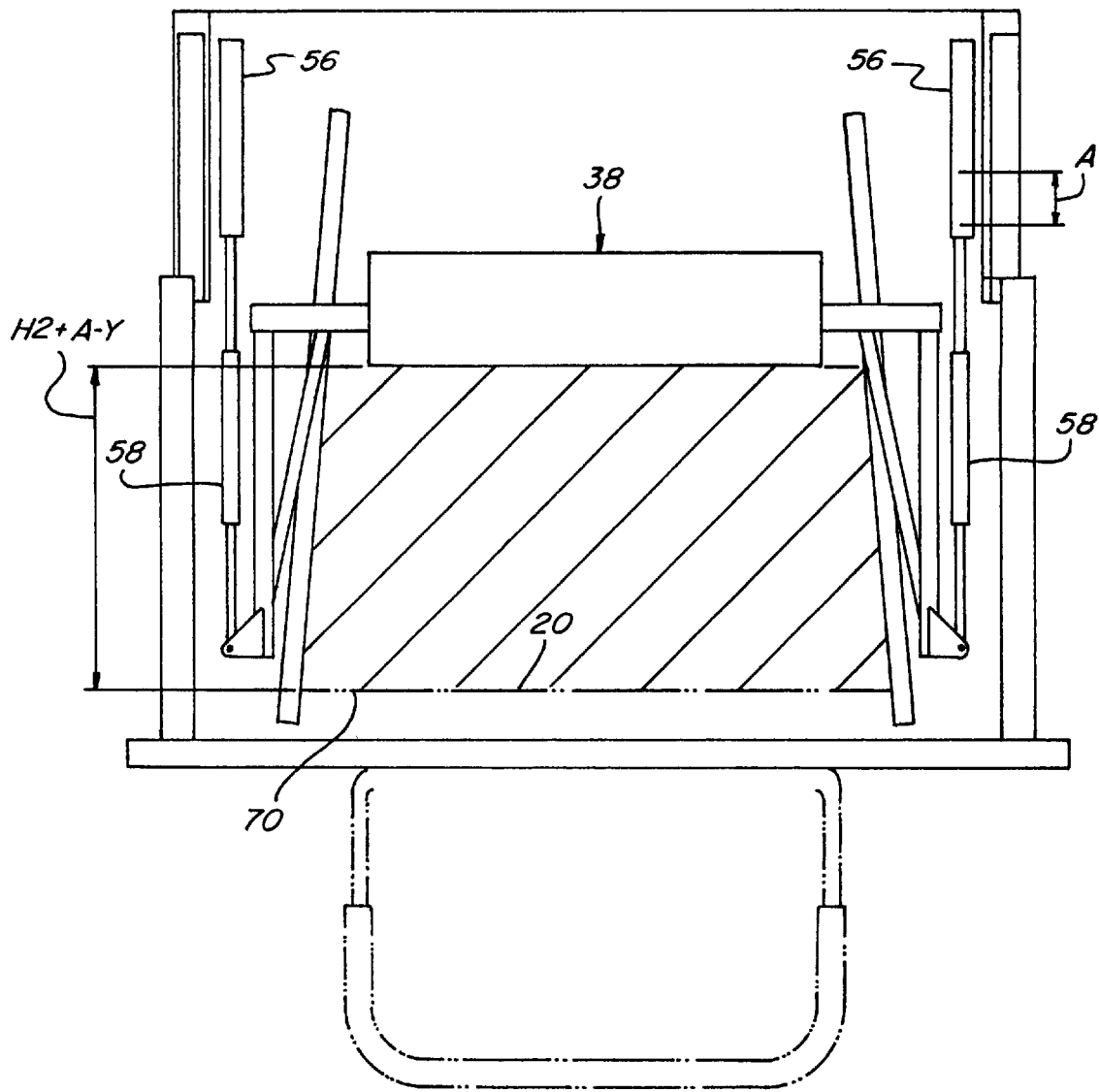
FIG. 9 is another simplified schematic representation of the mobile cotton harvester and apparatus of the invention with the compactor lowered in a compacting stroke from the second position.

As the cotton fills new void 72, the auger motor pressure will build and when it reaches the predetermined or set pressure value, rotation of augers 54 may be stopped and rods 66 of compacting cylinders 58 will be simultaneously fully extended by the amount Y or until maximum system pressure or a relief pressure is reached, while indexing cylinders 56 remain retracted by the amount A, such that compactor 38 will again be moved downwardly to a compacting position a distance H2+A−Y above floor 20 to compact and integrate the cotton beneath compactor 38 into the partial cotton module segment 70, as shown in FIG. 9. Again, this can be done manually or automatically. After the compacting stroke, the compacting cylinders 58 are then fully retracted by the amount Y completing the compacting cycle and thereby lowering the auger motor pressure and leaving the remaining portion of void area 72 above module 70 to be filled with the incoming cotton. Augers 54 will now again be rotated in the direction reverse of the previous direction.

This sequence of steps, namely, augering the cotton in area 72 toward one end, compacting when auger motor pressure reaches a predetermined level, and augering in a reverse direction, is repeated, the height of module segment 70 gradually building and the length of the compacting strokes gradually decreasing.

Module building by compacting cylinders 58 from the second position is completed when the auger motor pressure stays above the predetermined value after compacting cylinders 58 perform a compacting cycle, or when one or more of the other conditions discussed above are met, which signals that module segment 70 has reached a desired degree of compaction and a predetermined height beneath compactor 38.

Next, to further compact the module segment from the second position, indexing cylinders 56 are used to perform a packing cycle. The downward packing stroke by indexing cylinders 56 can be activated manually using control 102 or automatically by the auger motor pressure staying above the predetermined or set pressure value after the compacting cylinders 58 perform one of their compacting cycles. During the packing stroke, augers 54 preferably stop and the compacting cylinders 58 remain retracted. In the packing stroke, indexing cylinders 56 are simultaneously extended by an amount equal to all or a portion of the distance A, thereby driving compactor 38 downwardly, packing the cotton evenly and simultaneously beneath compactor 38.

Figure 10:
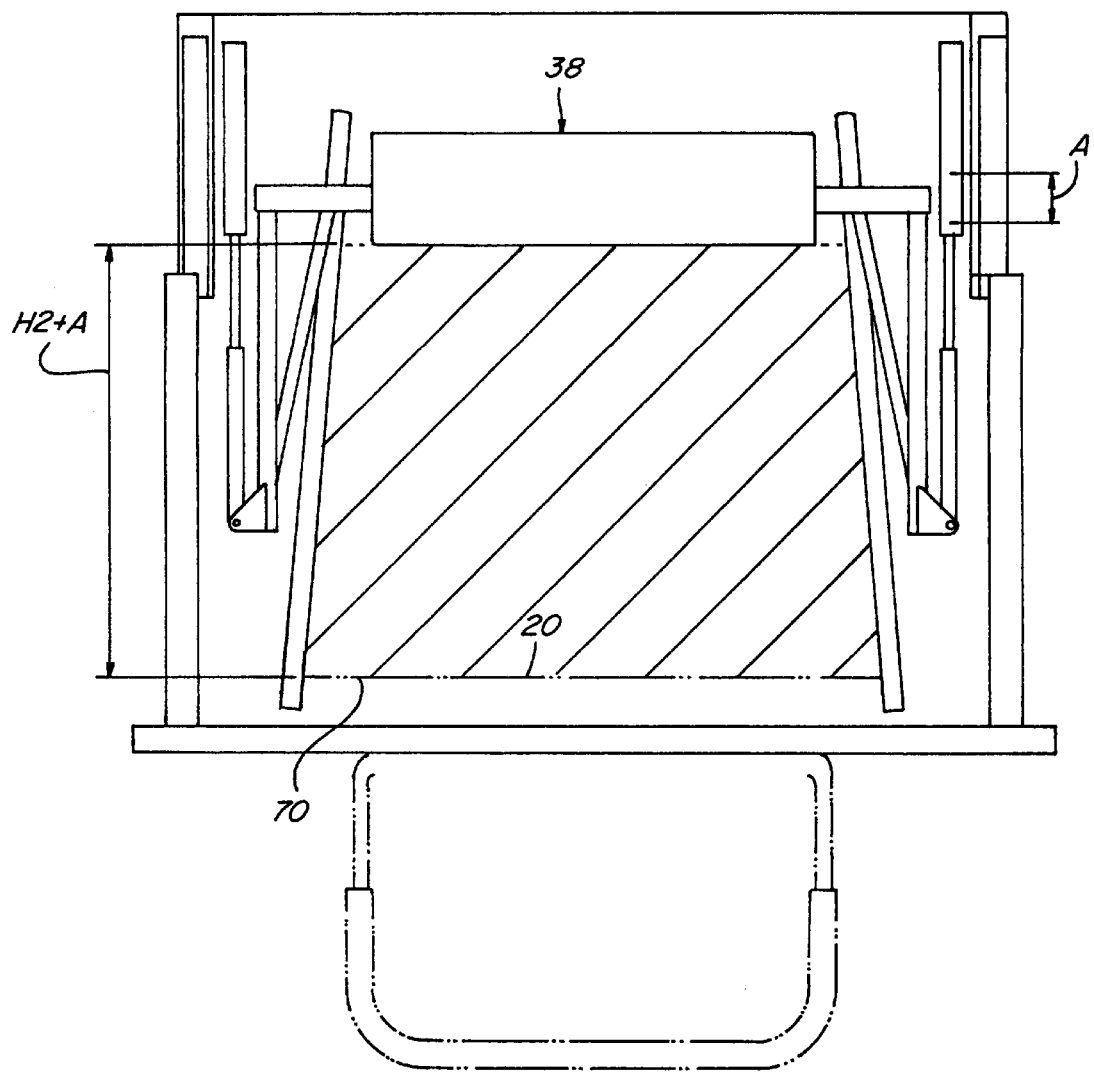
FIG. 10 is another simplified schematic representation of the mobile cotton harvester and apparatus of the invention with the module built to the second position of the compactor.

The indexing cylinders 56 then retract again to complete the packing cycle and position compactor 38 at the second position H2+A thereby lowering the auger motor pressure and leaving a void area for cotton to fill. Augers 54 again reverse direction and the void begins to fill with cotton. Auger motor pressure builds again to the predetermined or set pressure and the compacting cylinders 58 are again manually or automatically activated to perform a compacting cycle. This sequence of steps is then repeated until the auger motor pressure stays above the predetermined or set pressure value after a compacting cycle, the auger rotation direction being reversed after each compacting cycle. Indexing cylinders 56 are then activated to perform a packing cycle. Then, the augering and compaction steps are repeated until the auger motor pressure stays above the predetermined or set pressure value, a packing cycle by indexing cylinders 56 being used when the auger motor pressure after a compacting cycle remains above the predetermined value. Module building by the indexing cylinders 56 in the second position is completed when the auger motor pressure stays above the predetermined or set value after indexing cylinders 56 perform a packing cycle, or when one or more of the other conditions are met, signaling that module segment 70 has been compacted and built to a height of about the distance H2+A above floor 20, as shown in FIG. 10.

Referring now to FIG. 11, indexing cylinders 56 will then be manually or automatically activated to retract by an amount B in the above described manner from the second position to move compactor 38 up to a third indexing position, which is the amount H2+A+B above floor 20, thereby providing a new void area 72 above module segment 70 to fill with incoming cotton from conveyor structure 18. Again, indexing cylinders 56 can alternatively be activated to retract to the third position after a set amount of time, a predetermined number of indexing cylinder packing strokes, by a combination of factors, or after visual inspection. As a result of retracting indexing cylinders 56 to position compactor 38 at the third position, the auger motor pressure lowers. Augers 54 will also reverse direction from the previous direction they were turning before indexing. The incoming cotton is continuously distributed into the cotton module being built under compactor 38, and the compaction stroke of the compacting cylinders 58 is again activated by the auger motor pressure reaching the predetermined or set pressure value. Again, when this occurs, augers 54 can continue or stop rotating and the compacting cylinders 58 will simultaneously extend lowering the compactor 38 for compacting the cotton under it. Indexing cylinders 56 remain in the third position during this operation.

The compacting cylinders 58 then retract to complete the compacting cycle thereby lowering the auger motor pressure and leaving a void area 72 for cotton to fill, and augers 54 reverse direction from the previous direction. As cotton is added to the module, the auger motor pressure builds again and another compacting cycle by compacting cylinders 58 is performed. These steps are repeated until the auger motor pressure stays above the predetermined or set pressure value after a compacting cycle.

Module building by compacting cylinders 58 in the third position is completed when the auger motor pressure stays above the predetermined or set value after compacting cylinders 58 perform a compacting cycle. Then, a packing cycle by indexing cylinders 56 will be performed to pack the cotton into module segment 70 beneath compactor 38. Here, it should be noted that with compactor 38 in this position, the density of module segment 70 may be great enough and/or segment 70 high enough that compaction by compacting cylinders 58 may not be necessary or beneficial. In this instance, the compaction may be done only using indexing cylinders 56. The maximum packing stroke by cylinders 56 from the third position is the distance A+B, which is longer than that from the second position, A, although the packing stroke distance, like the other stroke lengths, can be varied as required or desired for a particular application. Also, the degree of compaction of the cotton beneath compactor 38 may be sufficiently high such that the module segment 70 itself will limit or determine the possible extent of the packing stroke, similarly to the compacting stroke, by the reaching of the relief pressure for indexing cylinders 56 or the maximum system pressure. When indexing cylinders 56 retract, the auger motor pressure is lower and the remaining void area 72 can be filled with cotton. Augers 54 reverse direction from the previous direction, and alternating augering and compacting cycles are repeated until the auger motor pressure stays above the predetermined or set pressure value after a compacting cycle, the rotational direction of augers 54 being reversed after each compacting cycle. Indexing cylinders 56 are then activated to perform an indexing packing stroke. Indexing cylinders 56 retract and the augering, compacting, and packing steps are repeated in the above sequence until the auger motor pressure stays above the predetermined or set pressure, or one or more of the other conditions are met, indicating that the module building at the third position is complete, or after visual inspection. To signal the operator that the module is nearing completion, an automatic warning system can be provided including a module status signal output device 108 connected to ECU 88 and operable to signal the operator to enable the operator to make determinations such as whether a current pass over the cotton field should or can be completed or a new pass made before the module is unloaded. Module status signal 108 can include a series of indicator lights showing module height or some other parameter, to aid in this determination. A module complete signal can also be provided which is automatically activated to inform the operator that module 70 is complete and ready to be unloaded. Here, it should be noted that if a decision is made to unload an incomplete module, it can be safely done, as the incomplete module at any time after compaction will be adequately compacted so as to comprise a unitary structure that will retain its shape when removed from chamber 34 and subsequently stored and handled. An important factor to be considered by the operator when determining whether to complete a pass through a field or start a new pass is the harvesting yield which is optionally monitored automatically during the harvesting operation. Typically, a harvester such as harvester 10 having six harvesting units 14 can harvest as much as about 500 pounds of cotton crop per minute and if harvesting is continued after module 70 is built to such an extent that augers 54 are stopped and are no longer capable of integrating the cotton into module 70, there is the risk that a sufficient amount of cotton will be deposited onto and present on compactor 38 so as to be compacted against the top or roof of chamber 34 by compactor 38 on its upstrokes or when returning to the retracted or initial position such that the cotton could possibly damage the top or roof and require manual removal.

When the operator comes out of the field or otherwise is finished with module 70, a module build switch 110 can be switched off and compacting cylinders 58 and indexing cylinders 56 retracted completely, to position compactor 38 in the retracted or initial position, as shown in FIG. 12, such that a clearance space 74 exists above module segment 70 which is now a completed module, or compactor is sufficiently removed from module 70 such that module 70 can be unloaded without damage from chamber 34. Side wall 24 and/or 26 can then be released by pivoting or otherwise moving outwardly to facilitate removal of module 70 from chamber 34, for instance, using a release mechanism such as mechanism 120 shown in FIG. 15 and discussed hereinafter.

Figure 14:
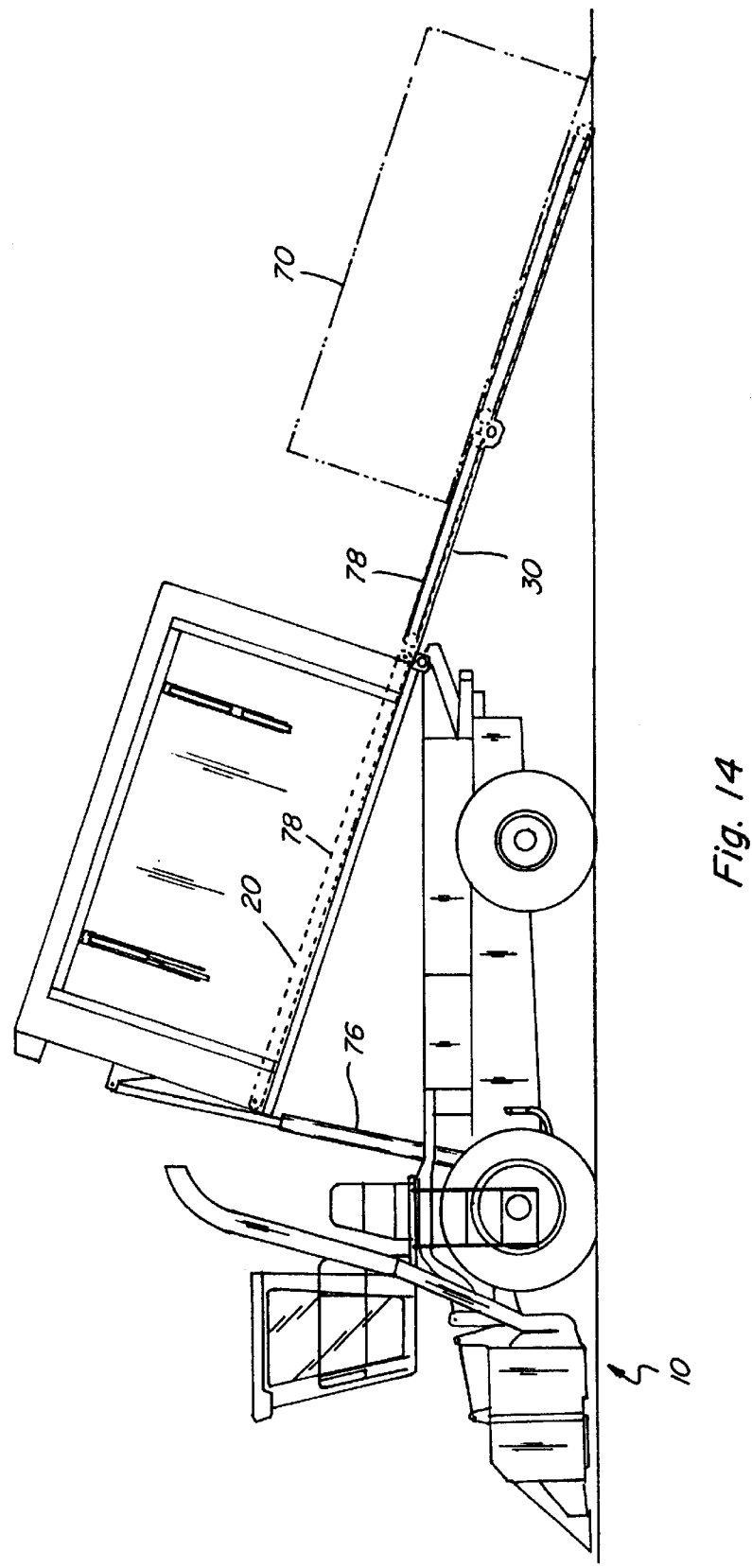
FIG. 14 is another side view of the mobile cotton harvester and apparatus of the invention showing the completed cotton module being unloaded from the chamber.

Turning to FIG. 14, to unload completed module 70, the forward end of apparatus 12 can be elevated by extending a conventional fluid cylinder 76 connected between the forward end of apparatus 12 and harvester 10, and gate structure 30 unfolded using fluid cylinders or other apparatus for that purpose to provide or serve as a ramp extending from floor 20 to the ground or another location such as a trailer or truck bed for receiving module 70. Conventional drag chains 78 or other suitable moving elements on floor 20 and gate structure 30, such as belts or the like, can then be activated to drag or convey completed module 70 to the ground, and once the rear end of module 70 is on the ground, harvester 10 can be moved forwardly at about the same speed as the rearward movement of module 70 by drag chains 78 or the like, to facilitate gentle placement of module 70 onto the ground.

Due to the substantially even distribution of the cotton within chamber 34 and the simultaneous, even compacting forces applied during the building of the module 70 by apparatus 12, module 70 will have a unitary, consistent composition which allows it to retain a substantially rectangular freestanding shape for a long period of outdoor storage and during handling, and which allows it to be desirably processed by a traditional cotton gin using traditional handling apparatus and methods.

Regarding pressure, by using a two cylinder system, a lower system pressure or smaller cylinders can be used for the compacting cylinders compared to the indexing cylinders such that compacting strokes of progressively shorter length can be used, while a single indexing position is maintained by the indexing cylinders. Here, it should be noted that drivers 42 can each alternatively comprise a single fluid cylinder, or other driving arrangement such as, but not limited to, a combination fluid cylinder and gear arrangement such as a rack and pinion, a fluid motor or screw arrangement such as a screw jack, according to the present invention. An advantage, however, of utilizing drivers 42 including separate fluid cylinders for indexing and compacting functions as opposed to a single cylinder to perform both functions is the ability to use a simple measure such as the maximum length or fluid pressure of cylinders 58 as the measure of the compacting stroke. In this latter regard, it being possible to use a smaller size fluid cylinder for cylinders 58, compared to the size of cylinders 56, if desired. As representative values for amounts H1, H2, X, Y, A, and B, for the present embodiment discussed above, H1 can equal about 6.9 feet, H2 can equal about 4.9 feet; X can equal about 2.0 feet; Y can equal about 1.5 feet; and A and B can each equal about one third of X or about 8 inches, such that the maximum compaction strokes will be about 1.5 feet, the maximum packing strokes from the second indexing position will be about 8 inches, and the maximum packing strokes from the third indexing position will be about 16 inches. Thus, from the start position with compactor 38 at about 4.9 feet from floor 20 the maximum compacting strokes will compact module segment 70 down to about 3.4 feet high; from the second indexing position at about 5.6 feet above floor 20 the maximum compacting strokes will compact the module down to about 4.1 feet high and the maximum packing strokes will pack down to about 4.9 feet high; and from the third indexing position at about 6.2 feet above floor 20 it may be possible using the maximum compacting stroke to compact down to about 4.7 feet and using the maximum packing stroke down to a slightly higher level, about 4.9 feet, the desired completed module height in chamber 34 being approximately 6.2 feet, it being understood that module 70 will increase slightly in height and width at the top due to natural decompression or expansion of the cotton when removed from chamber 34.

In this regard, as noted above, chamber 34 shown has a bottom width viewed from the front or rear of about 7 feet and a length of about 16 feet, and completed modules 70 will have a height of about 6.2 feet when in chamber 34, after removal from chamber 34 and passage of sufficient time for normal expansion, the height of module 70 increasing to about 6.5 feet and module 70 assuming a more rectangular shape, such that a typical module 70 will have a volume of about 728 cubic feet (7 times 16 times 6.5). The weight of completed modules 70 will be from about 8,000 to about 11,000 pounds, which is approximately the current carrying capacity of harvesters such as harvester 10. Thus, average density of modules 70 can be computed using the following formula:

$$\begin{aligned}\text{Average Density} &= \text{Average Weight/Volume} \\ &= 9{,}500 \text{ pounds}/728 \text{ cubic feet} \\ &= 13.0 \text{ pounds/cubic foot.}\end{aligned}$$

It has been found that an average cotton density of about 12 pounds per cubic foot is adequate for providing the desired integration and unitary structure which enables modules 70 to be stored for long periods and handled without loss of shape or integrity. In comparison, currently, the largest cotton receiving basket of a conventional prior art cotton harvester, such as that shown in Covington et al. U.S. Pat. No. 5,533,932, is about 11 feet wide by 9.2 feet high by 14.2 feet long for a volume of about 1437 cubic feet, which is about twice the volume of chamber 34. The maximum weight of cotton that can be carried, again, as limited by the weight capacity of the harvester, is about the same as harvester 10, or 8,500 to 10,500 pounds. The average density of the compacted cotton using the compaction device of the referenced prior art patent can be computed using the same formula as follows:

$$\begin{aligned}\text{Average Density} &= \text{Average Weight/Volume} \\ &= 9{,}500/1437 \\ &= 6.6 \text{ pounds/cubic foot.}\end{aligned}$$

An expected maximum range of average density for known apparatus for compacting cotton in baskets of harvesters is about 7 pounds per cubic foot. Thus it can be seen by comparing the average 13.0 pounds/cubic foot cotton density achievable using the present module builder apparatus verses the average 6.6 pounds/cubic foot density achievable using the prior art basket and compacting apparatus, a substantially greater degree of compaction is achieved using the present module builder. This greater compaction and the evenness of the compaction, are maintained after the module is removed from chamber 34 and are instrumental to the ability of the module to retain its shape, even after a period of months of storage, and after handling and transporting. The greater compaction is also valuable as it provides sufficient cotton density such that module 70 will shed water at least to a significant extent when rained on, which has not been found to be true of cotton compacted to the lesser extent and less evenly by the prior art apparatus discussed above. These properties of the modules built according to the present invention are evidence of the superiority of even distribution and compaction of the cotton as compared to compaction by a member that pivots downwardly at only one end which relies on augers to compact at the other end.

Figure 15:
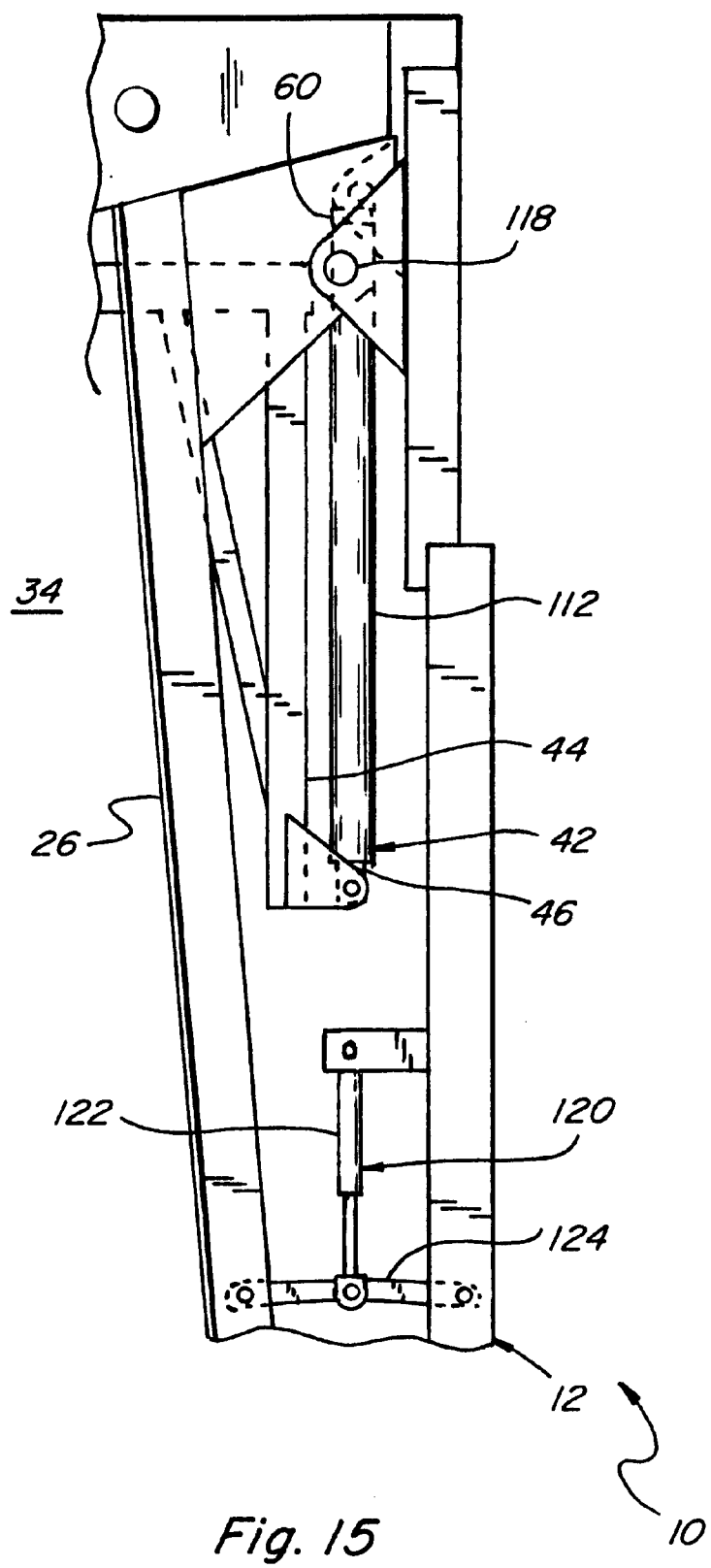
FIG. 15 is a fragmentary rear elevational view of the mobile cotton harvester of FIG. 1, showing an alternative single fluid cylinder driver.
Figure 16:
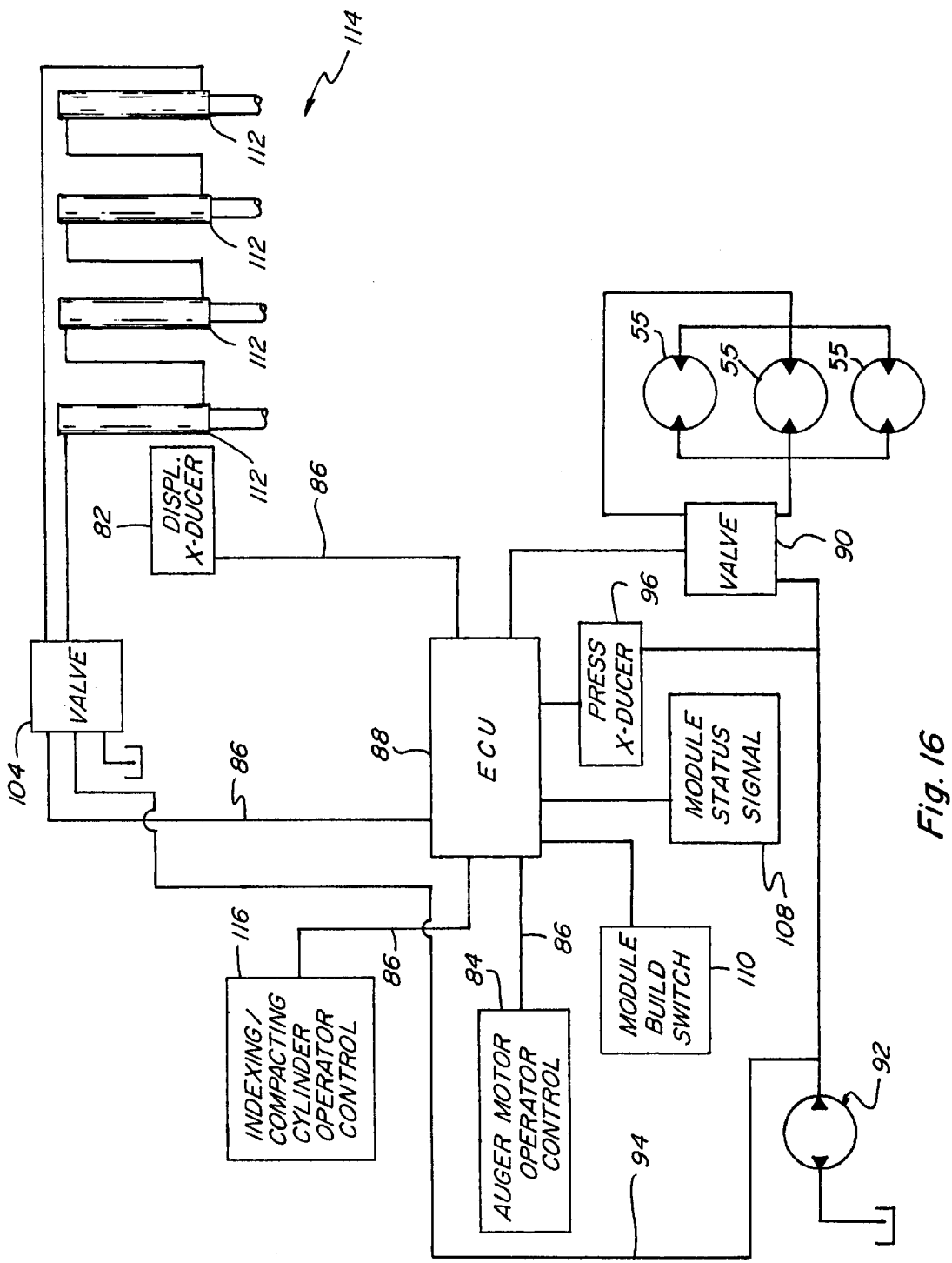
FIG. 16 is a simplified diagrammatic representation of an alternative control system for the present invention using the single fluid cylinder drivers of FIG. 15.

Referring now to FIGS. 15 and 16, apparatus 12 including single fluid cylinders 112 as drivers 42, and a control system 114 for automatically or semi-automatically controlling cylinders 112 for building modules in chamber 34 is shown, like parts of system 114 and system 80 being identified by like numbers. Again, like with system 80, although the various steps of the present method are preferably automatically operated using system 114, they can alternatively be selectably manually operated or semi-automatically operated, as desired. In FIG. 15, a single fluid cylinder 112 of a representative driver 42 is shown, including an upper end 60 connected to structural frame 22, and an opposite lower end 46 of a rod thereof connected to arm structure 44 in the above described manner. Single cylinders 112 have the same length as the combined cylinders 56 and 58 and operate to extend and retract the rod in the same manner, so as to be physically essentially interchangeable therewith Side wall 26 is also shown pivotally connected at the top thereof to structural frame 22 by a pin 118, and at the bottom by a release mechanism 120 noted above, including a fluid cylinder 122 connected at one end to frame 22 and at the opposite end to a folding linkage arrangement 124 connected between wall 26 and frame 22, such that operating cylinder 122 to retract will fold linkage arrangement 124 to pivot wall 26 about pin 118 sufficiently to enlarge chamber 34 such that a space will exist beside a module located therein to facilitate removal thereof, a similar release mechanism being provided for side wall 24 (not shown).

Referring also to FIGS. 4–12 illustrative steps of a preferred method of operation of apparatus 12 including drivers 42 having single cylinders 112 for building a cotton module in chamber 34, as cotton is being harvested by row units 14 and continually conveyed into module building chamber 34, will be discussed, it being understood that cylinders 112 should be envisioned in place of cylinders 56 and 58. Referring first to FIGS. 4, 15, and 16, compactor 38 is initially moved from the initial retracted position shown in FIG. 3 to the first indexing or compacting start position as shown, preferably at least generally parallel to floor 20 and the distance H2 above floor 20 by simultaneously extending fluid cylinders 112 by the required amount. This can be done manually by the operator, or automatically, as will be explained. The required amount of displacement of cylinders 112 can be detected or determined using any suitable conventional means, such as one or more conventional displacement sensors located in cylinders 112 or externally thereto, represented by displacement transducer 82 in FIG. 16, or an optical detector, proximity detector, liquid flow monitors, or the like. At the start of operation, augers 54 are rotated in a rotational direction for moving cotton therebeneath forwardly. Rotation of augers 54 is initiated as before by an auger motor control 84 connected by conductive path 86 to ECU 88 of system 114, ECU 88 being connected via conductive path 86 to three way solenoid valve 90 or other valve arrangement disposed in connection with auger motors 55 and fluid pump 92 via fluid path 94 operable for reversing direction of rotation of auger motors 55. Again, as when using the double cylinder system, the forward direction of rotation of augers 54 is selected as the cotton entering chamber 34 is blown to the rearward end therein and it is thus desired to first distribute cotton accumulating in the rear end of chamber 34 forwardly. It is desired to distribute the cotton in chamber 34 at least generally evenly and preferably substantially evenly over floor 20 and to achieve this it is good to also rotate augers 54 for distributing the cotton rearwardly, and then possibly forwardly again, or alternatingly forwardly and rearwardly as required to achieve the desired evenness. This can be done manually by the operator using control 84 while viewing the cotton in chamber 34, a yield monitor for cotton flow, or automatically by ECU 88 using inputs from pressure transducer 96 connected to fluid path 94 and operable for monitoring fluid pressure in auger motor 55 and outputting a signal representative thereof to ECU 88 over conductive path 86, ECU effecting the reversal of the direction of rotation of fluid motors 55 by sending a control signal to valve 90 when the output signals received indicate a predetermined pressure condition representative of conditions in chamber 34 wherein reversal is required or desired. Reversal can also be effected by other means, such as by use of a timer connected to or in ECU 88 to effect reversal after some elapsed time, or other condition is met.

As cotton begins to fill chamber 34, the fluid pressure in motors 55 will rise in response to increased resistance to movement of augers 54 in the cotton. This fluid pressure can be monitored by transducer 96, and when it reaches a predetermined level, a compacting stroke by cylinders 112 is initiated, the stroking and other operation of cylinders 112 being effected either manually by an operator using an indexing/compacting cylinder operator control 116, or automatically. Control 116 can be for instance a two position turn/push switch connected to ECU 88 via conductive path 86.

Referring to FIGS. 5, 15, and 16, again envisioning cylinders 112 in place of cylinders 56 and 58, the downward compacting stroke by cylinders 112 from the start position is activated manually by the operator moving the switch of control 116 to a manual position and pushing the switch which will send a signal to ECU 88 to stroke cylinders 112 one time to simultaneously fully extend by the amount Y, such that compactor 38 will be moved downwardly preferably while at least generally parallel to floor 20 to a first compacting position the distance H2–Y above floor 20, to compact the cotton beneath compactor 38 into a partial cotton module segment 70. To accomplish this, ECU 88 sends a control signal to a solenoid control valve 104 or the like via conductive path 86 to direct fluid under pressure through fluid path 94 from pump 92 to cylinders 112 to extend, and then to retract to the position to locate compactor 38 at the position in FIG. 4, when a fluid pressure in cylinders 112 reaches a predetermined pressure as detected by pressure transducer 96 or cylinders 112 reach a desired degree of extension as determined by displacement transducer 82 connected to ECU 88 by conductive path 86, to complete a compacting cycle. With control 116 switched to the automatic position, ECU 88 can initiate the compacting stroke when the output signal from transducer 96 reaches another predetermined value.

Referring to FIGS. 6, 15, and 16, after completion of the compacting cycle a void area 72 is present above module 70 for cotton to fill. Rotation of augers 54 in a direction reverse of the last previous direction is now initiated, either manually, or automatically by ECU 88 in the above described manner. The direction of rotation of augers 54 can be reversed one or more times to evenly distribute the cotton in chamber 34, as above. As the cotton is compacted by augers 54, the auger motor pressure will build again and when the auger motor pressure reaches a predetermined or set pressure value as detected by transducer 96, the rotation of augers 54 is preferably stopped and another compacting stroke is made, extending cylinders 112 simultaneously by an amount up to the amount Y, such that compactor 38 will again be moved downwardly preferably while at least generally parallel to floor 20 to the first compacting position a distance H2–Y or higher above floor 20 to again compact the cotton beneath compactor 38 into the partial cotton module segment 70. Here, it should be noted that the degree of compaction in subsequent compacting strokes is not expected to reach the full value H2–Y due to the greater amount of cotton now comprising module segment 70. Cylinders 112 are then fully retracted thereby completing another compacting cycle and again lowering the auger motor pressure when rotated, leaving the remaining portion of void area 72 above module 70 to be filled.

This sequence of steps, namely, augering the cotton in area 72 to evenly distribute the cotton over module segment 70, performing a compacting cycle when the auger motor pressure reaches a predetermined value, and then resuming augering, is repeated until the auger motor pressure during auger rotation stays above the predetermined value after a compacting cycle, the rotational direction of augers 54 being reversed after each compacting cycle, and the compacting stroke shortening after successive compacting cycles, due to the build up of module segment 70. As before, it should be noted that it is preferred that augers 54 at least momentarily pause and not be rotating when reversed so as to avoid sending a pressure spike through the hydraulic system and other problems.

Module building using cylinders 112 from the start position is preferably signaled as complete when the auger motor pressure during rotation of the augers stays above the predetermined value after a compacting cycle, that is cylinders 112 are extended to the extent possible given the operating pressure thereof and retracted, which signals that module segment 70 has reached a desired degree of compaction and height beneath compactor 38 approximately equal to the start position, or about the distance H2 above floor 20, as shown in FIG. 7. Alternatively, completion at the start position can be determined by other means, for instance, by an optical detector, by an elapsed time, by the completion of a predetermined number of compacting cycles, by the completion of a compacting stroke of a predetermined minimum length or time duration, by a combination of these, for instance, a predetermined number of compacting cycles within a predetermined time period, visually, or when some other desired condition is met.

Then, referring to FIGS. 8, 15, and 16, again envisioning cylinders 112 in place of cylinders 56 and 58, cylinders 112 will be activated to retract by a predetermined amount A to position compactor 38 at second indexing position a distance H2+A above floor 20 to create a new void area 72 to be packed with cotton. This can be accomplished either manually by an operator using control 116, or automatically. The upward indexing movement by cylinders 112 is activated manually by the operator moving the switch of control 116 to a manual position and pushing the switch which will send a signal to ECU 88 to retract cylinders 112 and when the desired position is reached the switch is released to halt the upward movement. The position can be determined visually or using a sensor or detector operable to determine the position of cylinders 112 such as transducer 82. For automatic operation, control 116 can be moved to the automatic position such that ECU 88 can determine the displacement of cylinders 112 using displacement transducer 82 which will output a signal representative thereof to ECU 88 via conductive path 86, such that, in turn, ECU 88 can send a control signal to solenoid control valve 104 or the like via conductive path 86 to direct fluid under pressure through fluid path 94 from pump 92 to cylinders 112 to retract by the appropriate amount. This can be initiated when a signal received from transducer 82 has detected cylinders 112 have positioned compactor 38 at position H1 and transducer 96 is sending a signal indicating that auger motor pressure is at the predetermined level for compacting after a compacting cycle. Due to the presence of new void area 72, the auger motor pressure will be lower during rotation of augers 54, and again, the rotation of auger 54 will be reversed.

As the cotton fills new void 72, the auger motor pressure will build and when it reaches the predetermined or set pressure value, rotation of augers 54 will be stopped and cylinders 112 will be simultaneously extended by the amount Y, such that compactor 38 will again be moved downwardly to a compacting position a distance H2+A−Y above floor 20 to compact and integrate the cotton beneath compactor 38 into the partial cotton module segment 70, as shown in FIG. 9. Again, this can be done manually or automatically. After the compacting stroke, cylinders 112 are then retracted by the amount Y completing the compacting cycle and thereby lowering the auger motor pressure and leaving the remaining portion of void area 72 above module 70 to be filled with the incoming cotton. Augers 54 will now again be rotated in the direction reverse of the previous direction.

This sequence of steps, namely, augering the cotton in area 72 toward one end, compacting when auger motor pressure reaches a predetermined level, and augering in a reverse direction, is repeated, the height of module segment 70 gradually building and the length of the compacting strokes gradually decreasing.

Module building by cylinders 112 from the second position is completed when the auger motor pressure stays above the predetermined value after cylinders 112 perform a compacting cycle, or when one or more of the other conditions discussed above are met, which signals that module segment 70 has reached a desired degree of compaction and a predetermined height beneath compactor 38 of about the distance H2+A above floor 20, as shown in FIG. 10.

Referring now to FIG. 11, cylinders 112 can then be manually or automatically activated to retract by an amount B in the above described manner from the second position to move compactor 38 up to a third indexing position, which is the amount H2+A+B above floor 20, thereby providing a new void area 72 above module segment 70 to fill with incoming cotton from conveyor structure 18. Again, cylinders 112 can alternatively be activated to retract to the third position after a set amount of time, a predetermined number of strokes, by a combination of factors, or after visual inspection. As a result of retracting cylinders 112 to position compactor 38 at the third position, the auger motor pressure lowers. Augers 54 will also reverse direction from the previous direction they were turning before indexing. The incoming cotton is continuously distributed into the cotton module being built under compactor 38, and the compaction stroke of cylinders 112 is again activated by the auger motor pressure reaching the predetermined or set pressure value. Again, when this occurs, augers 54 can continue or stop rotating and the cylinders 112 will simultaneously extend lowering the compactor 38 for compacting the cotton under it.

Cylinders 112 then retract to complete the compacting cycle thereby lowering the auger motor pressure and leaving a void area 72 for cotton to fill, and augers 54 reverse direction from the previous direction. As cotton is added to the module, the auger motor pressure builds again and another compacting cycle by cylinders 112 is performed. These steps are repeated until the auger motor pressure stays above the predetermined or set pressure value after a compacting cycle.

Module building in the third position is completed when the auger motor pressure stays above the predetermined or set value after cylinders 112 perform a compacting cycle or one or more of the other conditions are met, indicating that the module building at the third position is complete, or after visual inspection. To signal the operator that the module is nearing completion, an automatic warning system can again be provided including a module status signal output device 108 connected to ECU 88 and operable to signal the operator to enable the operator to make determinations such as whether a current pass over the cotton field should or can be completed or a new pass made before the module is unloaded.

When the operator comes out of the field or otherwise is finished with module 70, a module build switch 110 can be switched off and cylinders 112 retracted completely, to position compactor 38 in the retracted or initial position, as shown in FIG. 12, such that a clearance space 74 exists above module segment 70 which is now a completed module. Side wall 24 and/or 26 can then be released using mechanism 120 to facilitate removal of module 70 from chamber 34 in the above described manner.

Here, it should be understood that the modules 70 built using drivers 42 each including single cylinders 112, will be compacted to about the same average density as modules 70 built using the double cylinders, discussed previously. It should also be understood that, although both modules are illustrated as being built using compactor 38 in three indexing positions, a greater or a smaller number of indexing positions could likewise be used within the scope of the invention.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A mobile cotton harvester having a cotton module building capability, comprising:

at least one harvesting unit for removing cotton from cotton plants as the harvester moves across a cotton field;

a cotton receiver structure including a first surface having a predetermined extent and additional surfaces which with the first surface define and substantially enclose an interior space for receiving the cotton removed from the cotton plants;

structure for conveying the removed cotton from the at least one harvesting unit into the interior space; and apparatus for distributing and compacting the cotton within the interior space, including a compacting element located in the interior space, the compacting element supporting at least one member operable for distributing cotton in contact therewith at least generally evenly relative to the first surface, and at least one driver connected to the compacting element and operable for moving the compacting element to positions spaced from the first surface where the at least one member can be operated to distribute the cotton at least generally evenly relative to the first surface, and the at least one driver being operable for forceably moving the compacting element and the at least one member along a predetermined path of movement from the positions, respectively, toward the first surface and against cotton distributed between the compacting element and the first surface for simultaneously and substantially evenly compacting the cotton against the first surface to form a cotton module, wherein the at least one driver comprises a plurality of fluid cylinders positioned at spaced locations around the compacting element, respectively.

2. The mobile cotton harvester of claim 1, wherein the fluid cylinders are located externally of the cotton receiver structure and are connected to the compacting element by arms which extend through slots through the additional surfaces, respectively.

3. The mobile cotton harvester of claim 1, wherein the first surface is a floor and the additional surfaces extend upwardly therefrom.

4. The mobile cotton harvester of claim 1, wherein the driver comprises an indexing fluid cylinder having a rod element extendible and retractable for moving the compacting element between the positions, and a compacting cylinder mounted to the rod element and extendible for forceably driving the compacting element and the at least one member toward the first surface for compacting the cotton thereagainst.

5. The mobile cotton harvester of claim 1, wherein the driver comprises a single fluid cylinder having a rod element extendible and retractable for moving the compacting element between the different positions and extendible when in any of the positions for forceably driving the compacting element and the at least one member toward the first surface for compacting the cotton thereagainst.

6. The mobile cotton harvester of claim 1, wherein the predetermined path of movement is at least generally linear.

7. The mobile cotton harvester of claim 1, wherein the predetermined path of movement is at least generally perpendicular to the first surface.

8. A combined mobile cotton harvester and module builder, comprising:

at least one harvesting unit for removing cotton from cotton plants as the harvester is moved across a cotton field;

structure forming a compacting chamber for receiving and compacting the removed cotton therein, the structure including a floor having a predetermined extent in two perpendicular horizontal directions, and a plurality of walls extending upwardly from the floor therearound, defining a chamber interior;

conveyor structure for conveying the removed cotton from the at least one harvesting unit to the chamber interior; and a cotton distributor and compactor including a frame disposed in the chamber interior above the floor, the frame carrying members for rotation thereon rotatable in a first rotational direction for moving cotton received in the chamber in a first direction generally parallel to the floor and in a second rotational direction for moving the cotton in an opposite direction generally parallel to the floor for distributing the cotton generally evenly between the frame and the floor, and at least one driver connected to the frame and including at least one element displaceable for moving the frame upwardly and downwardly in the chamber interior between at least two positions spaced different distances above the floor for bringing the at least one member into contact with cotton supported on the floor for distributing the cotton at least generally evenly thereover, the at least one driver including an element displaceable to drive the frame and the at least one member downwardly against the cotton supported on the floor under a sufficient force to compact the cotton evenly over substantially the entire extent of the floor to form a compacted cotton module which will be freestanding and have a horizontal extent about equal to the extent of the floor when removed from the chamber.

9. The mobile combined cotton harvester and module builder of claim 8, wherein the at least one driver comprises at least one fluid cylinder.

10. The mobile combined cotton harvester and module builder of claim 9, wherein the at least one driver comprises a first fluid cylinder for moving the frame between the positions and a second fluid cylinder for compacting the cotton.

11. The mobile combined cotton harvester and module builder of claim 10, wherein the first and second fluid cylinders are connected end-to-end, one to the other.

12. The mobile combined cotton harvester and module builder of claim 8, wherein the at least one driver is located externally to the chamber and is connected to the frame by arms which extend through upwardly extending slots through the walls.

13. The mobile combined cotton harvester of claim 8, wherein the structure forming the compacting chamber includes a wall or end which opens to allow removing the cotton module segment from the chamber.

14. The mobile combined cotton harvester of claim 8, wherein the driver comprises a single fluid cylinder.

15. The mobile combined cotton harvester of claim 8, wherein the frame is movable upwardly and downwardly in the chamber interior along a predetermined path of movement that is at least generally linear.

16. The mobile combined cotton harvester of claim 15, wherein the predetermined path of movement is at least generally perpendicular to the floor.

17. A combined mobile cotton harvester and cotton module builder, comprising:

at least one harvesting unit for removing cotton from cotton plants as the harvester moves across a cotton field;

compactor chamber structure for receiving the cotton removed from the cotton plants, the compactor chamber structure including a floor having a predetermined horizontal extent and side walls and ends extending upwardly from the floor defining and substantially enclosing an interior space;

structure for conveying the removed cotton from the at least one harvesting unit into the interior space; and apparatus for distributing and compacting the cotton conveyed into the interior space, including a frame located in the interior space and oriented in a predetermined orientation generally parallel to the floor, the frame having a horizontal extent only marginally smaller than the horizontal extent of the floor and carrying at least one member which is operably movable when in contact with cotton beneath the frame for distributing the cotton substantially evenly over the floor and for integrating cotton conveyed into the interior space above the frame into the cotton beneath the frame, and at least one driver connected to the frame and operable for moving the frame while in the predetermined orientation upwardly and downwardly relative to the floor for positioning the at least one member in contact with the cotton beneath the frame, and the at least one driver being operable for forceably driving the frame while in the predetermined orientation downwardly against the cotton therebeneath to compact the cotton evenly over substantially the entire extent of the floor sufficiently to form the cotton into a unitary compacted module which will be freestanding and retain a horizontal extent approximately equal to the horizontal extent of the floor when removed from the interior space.

18. The combined mobile cotton harvester and cotton module builder of claim 17, wherein the at least one driver comprises a plurality of fluid cylinders positioned at spaced locations around the frame and connected to the frame by arms which extend through slots through side walls of the compactor chamber structure.

19. The combined mobile cotton harvester and module builder of claim 17, wherein the driver comprises a first fluid cylinder for moving the frame between the positions and a second fluid cylinder for compacting the cotton.

20. The combined mobile cotton harvester and module builder of claim 17, wherein the driver comprises a single fluid cylinder.

* * * * *